(12) United States Patent
Boesen

(10) Patent No.: US 7,508,411 B2
(45) Date of Patent: *Mar. 24, 2009

(54) PERSONAL COMMUNICATIONS DEVICE

(75) Inventor: Peter V. Boesen, Des Moines, IA (US)

(73) Assignee: S.P. Technologies LLP, St. Petersburg, FL (US)

( * ) Notice: Subject to any disclaimer, the term of this patent is extended or adjusted under 35 U.S.C. 154(b) by 610 days.

This patent is subject to a terminal disclaimer.

(21) Appl. No.: 10/776,493

(22) Filed: Feb. 11, 2004

(65) Prior Publication Data

US 2004/0160511 A1      Aug. 19, 2004

Related U.S. Application Data

(63) Continuation-in-part of application No. 10/368,924, filed on Feb. 18, 2003, now Pat. No. 6,892,082, which is a continuation of application No. 09/846,789, filed on May 1, 2001, now Pat. No. 6,542,721, which is a continuation-in-part of application No. 09/587,743, filed on Jun. 5, 2000, now Pat. No. 6,408,081, which is a continuation-in-part of application No. 09/416,168, filed on Oct. 11, 1999, now Pat. No. 6,560,468.

(51) Int. Cl.
*H04N 7/14* (2006.01)
*H04M 1/00* (2006.01)

(52) U.S. Cl. .............. 348/14.02; 348/14.01; 348/14.03; 455/575.3

(58) Field of Classification Search ... 348/14.01–14.09, 348/14.1, 14.11, 14.12, 14.13; 455/566, 455/575.1, 575.2, 575.3, 575.4; 379/433.12, 379/433.1

See application file for complete search history.

(56) References Cited

U.S. PATENT DOCUMENTS

| | | | |
|---|---|---|---|
| 4,150,262 A | 4/1979 | Ono | |
| 4,334,315 A | 6/1982 | Ono et al. | |
| 4,374,382 A | 2/1983 | Markowitz | |
| 4,528,987 A | 7/1985 | Slocum | |
| 4,588,867 A | 5/1986 | Konomi | |
| 4,654,883 A | 3/1987 | Iwata | |

(Continued)

FOREIGN PATENT DOCUMENTS

EP     0 539 699 A2     5/1993

(Continued)

OTHER PUBLICATIONS

"U.S. Will Oversee Cell-Phone Safety Studies", www.cmpnet.com.

(Continued)

*Primary Examiner*—Melur Ramakrishnaiah
(74) *Attorney, Agent, or Firm*—McKee, Voorhees & Sease, P.L.C.

(57) ABSTRACT

A handheld personal communications device includes a housing having at least a first body and a second body. There is a voice transceiver disposed within the housing. User interface elements are positioned on one or more sides of each of the at least two bodies. The user interface elements can include one or more video cameras, displays, or plurality of buttons.

12 Claims, 18 Drawing Sheets

U.S. PATENT DOCUMENTS

| | | |
|---|---|---|
| 4,682,180 A | 7/1987 | Gams |
| 4,773,427 A | 9/1988 | Inoue et al. |
| 4,791,673 A | 12/1988 | Schreiber |
| 4,791,933 A | 12/1988 | Asai et al. |
| 4,854,328 A | 8/1989 | Pollack |
| 5,010,890 A | 4/1991 | Pfohl et al. |
| 5,052,398 A | 10/1991 | Gober |
| 5,151,946 A | 9/1992 | Martensson |
| 5,189,632 A | 2/1993 | Paajanen et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart, III |
| 5,349,863 A | 9/1994 | Dumont et al. |
| 5,381,798 A | 1/1995 | Burrows |
| 5,417,222 A | 5/1995 | Dempsey et al. |
| 5,422,934 A | 6/1995 | Massa |
| 5,458,123 A | 10/1995 | Unger |
| 5,497,339 A | 3/1996 | Bernard |
| 5,584,054 A | 12/1996 | Tyneslo et al. |
| 5,606,594 A | 2/1997 | Register et al. |
| 5,613,222 A | 3/1997 | Guenther |
| 5,625,673 A | 4/1997 | Grewe et al. |
| 5,657,370 A | 8/1997 | Tsugane et al. |
| 5,659,620 A | 8/1997 | Kuhlman |
| 5,675,524 A | 10/1997 | Bernard |
| 5,692,059 A | 11/1997 | Kruger |
| 5,715,524 A | 2/1998 | Jambhekar et al. |
| 5,721,783 A | 2/1998 | Anderson |
| 5,749,072 A | 5/1998 | Mazurkiewicz et al. |
| 5,758,294 A | 5/1998 | Ganesan et al. |
| 5,771,438 A | 6/1998 | Palermo et al. |
| 5,786,106 A | 7/1998 | Armani |
| 5,797,089 A | 8/1998 | Nguyen |
| 5,802,167 A | 9/1998 | Hong |
| 5,894,595 A | 4/1999 | Foladare et al. |
| 5,898,774 A | 4/1999 | Shindo |
| 5,898,908 A | 4/1999 | Griffin et al. |
| D411,540 S | 6/1999 | Mavrakis et al. |
| 5,929,774 A | 7/1999 | Charlton |
| 5,930,729 A | 7/1999 | Khamis et al. |
| 5,933,506 A | 8/1999 | Aoki et al. |
| 5,933,783 A | 8/1999 | Kawakami et al. |
| 5,982,764 A * | 11/1999 | Palermo et al. ............. 370/345 |
| 5,983,073 A | 11/1999 | Ditzik |
| 5,987,146 A | 11/1999 | Pluvinage et al. |
| 6,002,777 A | 12/1999 | Grasfield et al. |
| 6,021,207 A | 2/2000 | Puthuff et al. |
| 6,047,196 A | 4/2000 | Mäkelä et al. |
| 6,048,305 A | 4/2000 | Bauman et al. |
| 6,048,324 A | 4/2000 | Socci et al. |
| 6,052,603 A | 4/2000 | Kinzalow et al. |
| 6,069,593 A | 5/2000 | Lebby et al. |
| 6,073,031 A | 6/2000 | Helstab et al. |
| 6,081,724 A | 6/2000 | Wilson |
| 6,094,492 A | 7/2000 | Boesen |
| 6,112,103 A | 8/2000 | Puthuff |
| 6,125,286 A | 9/2000 | Jahagirdar et al. |
| 6,128,475 A | 10/2000 | Wicks et al. |
| 6,137,889 A | 10/2000 | Shennib et al. |
| 6,164,531 A | 12/2000 | Harris et al. |
| 6,167,039 A | 12/2000 | Karlsson et al. |
| 6,181,801 B1 | 1/2001 | Puthuff et al. |
| 6,201,977 B1 | 3/2001 | Cathey et al. |
| 6,230,029 B1 | 5/2001 | Hahn et al. |
| 6,240,302 B1 | 5/2001 | Harrison |
| 6,243,595 B1 | 6/2001 | Lee et al. |
| 6,272,227 B1 | 8/2001 | Yanagisawa |
| 6,308,074 B1 | 10/2001 | Chandra et al. |
| 6,315,074 B1 | 11/2001 | Achhammer et al. |
| 6,324,412 B1 | 11/2001 | Alen et al. |
| 6,370,362 B1 | 4/2002 | Hansen et al. |
| 6,408,081 B1 | 6/2002 | Boesen |
| 6,418,326 B1 | 7/2002 | Heinonen et al. |
| 6,442,637 B1 | 8/2002 | Hawkins et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,510,325 B1 * | 1/2003 | Mack et al. ............... 455/575.2 |
| 6,542,721 B2 | 4/2003 | Boesen |
| 6,560,468 B1 | 5/2003 | Boesen |
| 6,664,713 B2 | 12/2003 | Boesen |
| 6,694,180 B1 | 2/2004 | Boesen |
| 6,714,233 B2 * | 3/2004 | Chihara et al. ........... 348/14.02 |
| 6,718,043 B1 | 4/2004 | Boesen |
| 6,738,485 B1 | 5/2004 | Boesen |
| 6,748,243 B1 | 6/2004 | Kubo et al. |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 7,176,961 B2 * | 2/2007 | Shimamura ............ 348/207.99 |
| 2001/0027121 A1 | 10/2001 | Boesen |
| 2002/0057810 A1 | 5/2002 | Boesen |
| 2002/0076073 A1 | 6/2002 | Taenzer et al. |
| 2002/0118852 A1 | 8/2002 | Boesen |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0196009 A1 | 9/2005 | Boesen |

FOREIGN PATENT DOCUMENTS

| | | |
|---|---|---|
| EP | 0 671 115 B1 | 9/1995 |
| EP | 0 683 621 A2 | 11/1995 |
| EP | 0 776 115 A2 | 5/1997 |
| EP | 0 776 140 A1 | 5/1997 |
| EP | 0 798 650 A2 | 10/1997 |
| EP | 0 817 393 A2 | 1/1998 |
| EP | 0 873 031 A1 | 10/1998 |
| EP | 0 897 236 A2 | 2/1999 |
| GB | 2 074 817 A | 11/1981 |
| GB | 2 318 944 A | 5/1998 |
| GB | 2 326 051 A | 12/1998 |
| GB | 2 328 343 A | 2/1999 |
| GB | 2 333 926 A | 8/1999 |
| GB | 2 337 891 A | 12/1999 |
| GB | 2 343 324 A | 5/2000 |
| JP | 04-298878 | 10/1992 |
| JP | 04-307841 | 10/1992 |
| JP | 5-30918 | 4/1993 |
| JP | 5-43218 | 6/1993 |
| JP | 406253296 A * | 9/1994 |
| JP | 06-292195 | 10/1994 |
| JP | 07-093125 | 4/1995 |
| JP | 08-321863 * | 12/1996 |
| JP | 09-187060 * | 7/1997 |
| JP | 10163939 A | 6/1998 |
| JP | 2000022670 A | 1/2000 |
| JP | 2001-298516 * | 10/2001 |
| WO | WO 96/35288 | 11/1996 |
| WO | WO 96/38970 | 12/1996 |
| WO | WO 97/09813 | 3/1997 |
| WO | WO 98/19435 | 5/1998 |
| WO | WO 00/49731 | 9/2000 |
| WO | WO 00/69151 | 11/2000 |

| | | | |
|---|---|---|---|
| WO | WO 01/13222 | A2 | 2/2001 |
| WO | WO 01/13605 | A2 | 2/2001 |
| WO | WO 01/13605 | A3 | 2/2001 |
| WO | WO 01/77786 | A2 | 10/2001 |
| WO | WO 01/77786 | A3 | 10/2001 |
| WO | WO 01/77817 | A1 | 10/2001 |
| WO | WO 02/39703 | A2 | 5/2002 |

OTHER PUBLICATIONS

"Wireless Worries: Are Cell Phones A Danger to You and Your Children", ABC News May 26, 2000.
"A One-Size Disposable Hearing Aid is Introduced", The Hearing Journal, Apr. 2000, vol. 53, No. 4.
"Hearing In Noise", The Hearing Review Jan. 1999; Siemens.
"Blue Tooth Usage Model" The Official Bluetooth Website.
"Handhelds That Do It All" BusinessWeek Lifestyle, Feb. 2001.
"Your Next Cellphone", Popular Science Apr. 2001.
"Wireless Future Sizzles" The Times Biscayne, Sep. 26, 1999.
"5th International Conference ON Wearable Computing" Pen Computiung Magazine Aug. 2000.
Wireless Research Laboratory www.bell-labs.com/org/1131—Jun. 26, 2000.
"Scientists link eye cancer to mobile phones" The Sunday Times: New Jan. 14, 2001.
AIR MAGIC Wireless Headset User's Guide.
"Brain cancer victim sues cell-phone providers" www.CNN.com/2000/TECH/computing/08/08/cellular.cancer.lawsuit.idg/index.html Aug. 8, 2000.
"Agilent Technologies Announces Availabilty of Wireless Network Cap for Portable Patient Monitoring" www.healthcare.agilent.com/press_releases/PRHS2920030.html.
"Agilent Technologies Introduces New Telemon Patient Monitor" www.healthcare.agilent.com/press_releases/PRHS2920016.html.
"Agilent Technologies M3 and M4 Series Patient Monitors" www.health.../show_product.pl? M3%20and%20M4%20Series%20Patient%20Monitor.
"What is a Wireless LAN?" White Paper PROXIM Mar. 1998.
Medical Manager Health Systems letter Feb. 22, 2000.
"Report Urges Curbs On Mobile Phone Use" by Ian Cameron, Electronics Times May 15, 2000.
"The Latest On Cell Phone Emissions".
Photographs of Highstart Electronic Device showing China Patent No. 01215353.2 and China Design Patent No. 01318939.3.
"Mobile Phones Information Pages—Nokia 6650 Features" www.directmobilephones.com/infopages/nokia_6650info.htm, 3 pages, Jun. 14, 2003.
"Nokia 6650 Phone Features" www.nokia.com/nokia/0,8764,3162,00.html; Jun. 14, 2003, 2 pages.
"Our Price: Not Announced Availabilty: Available for Pre-Order, Available for Pre-Order UK" Nokia 6650; www.expansys.us/product.asp?code=6650; Jun. 14, 2003, 2 pages.
Sprint "Online User's Guide" Dual Band/Tri Mode PCS Phone SCP-5300 Sanyo, 196 Index.
Fox, Armando et al. "GloMop Update" glomop@full-sail.cs.berkeley.edu, Daedalus Retreat Jun. 1996, 21 pages.
Bartlett, Joel F. "W4—the Wireless World Wide Web" Digital Equipment Corporation Western Research Lab, 0-8186-6345-6/95 IEEE, pp. 176-178.
Fox, Armando et al. "GloMop: Global Mobile Computing By Proxy" GloMop-FoxBrewer.txt, 1 page, University of California at Berkeley.

* cited by examiner

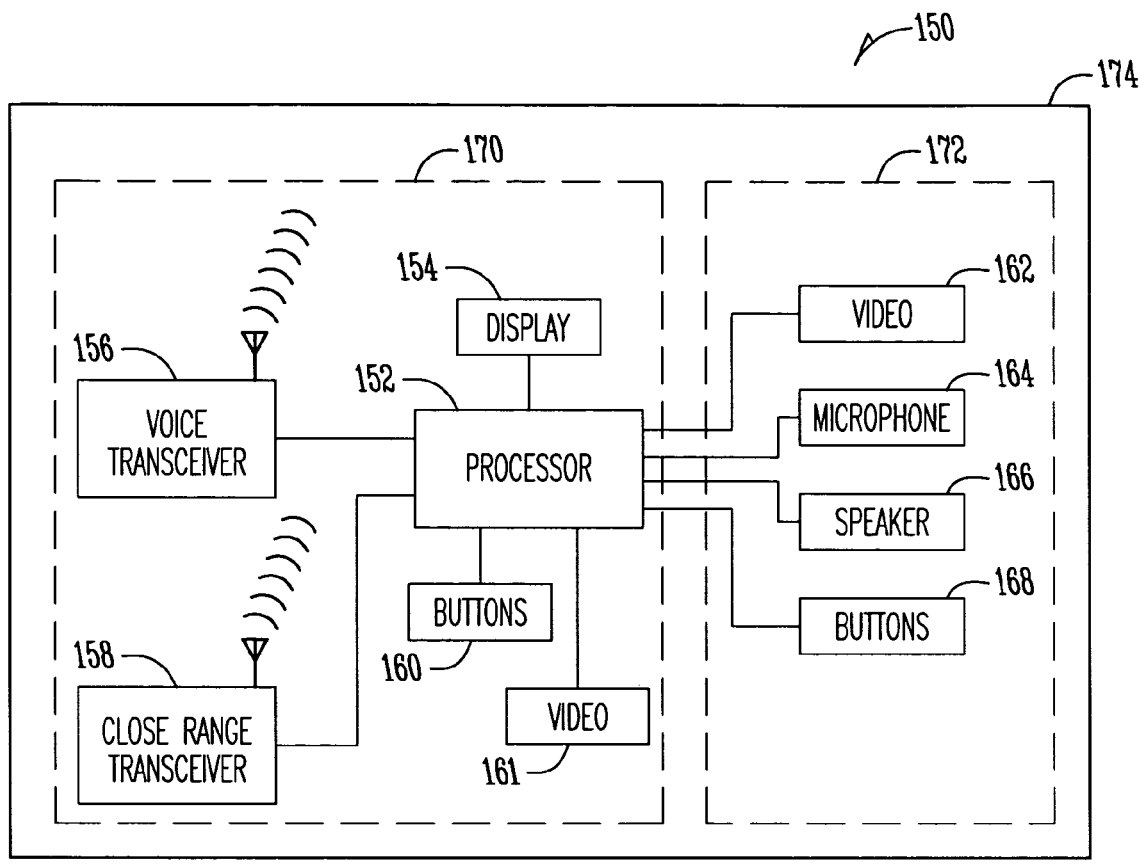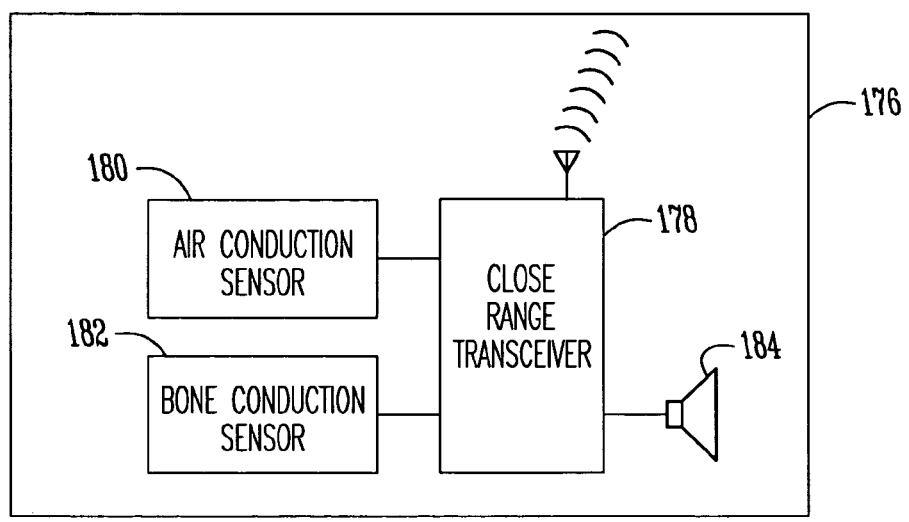
Fig.25

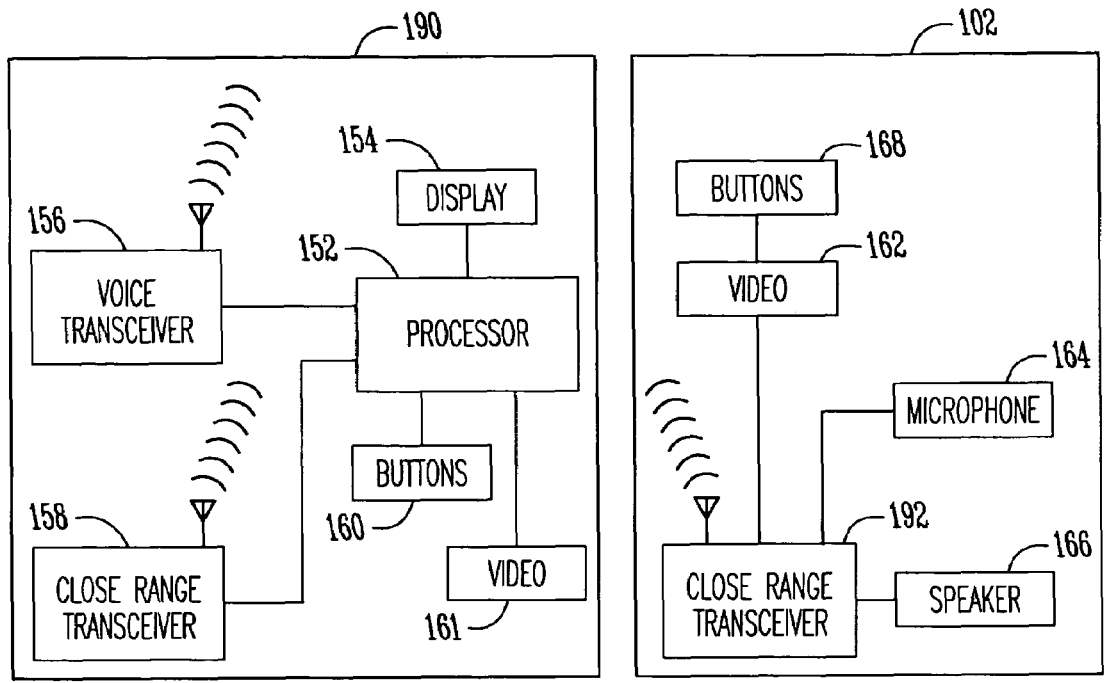
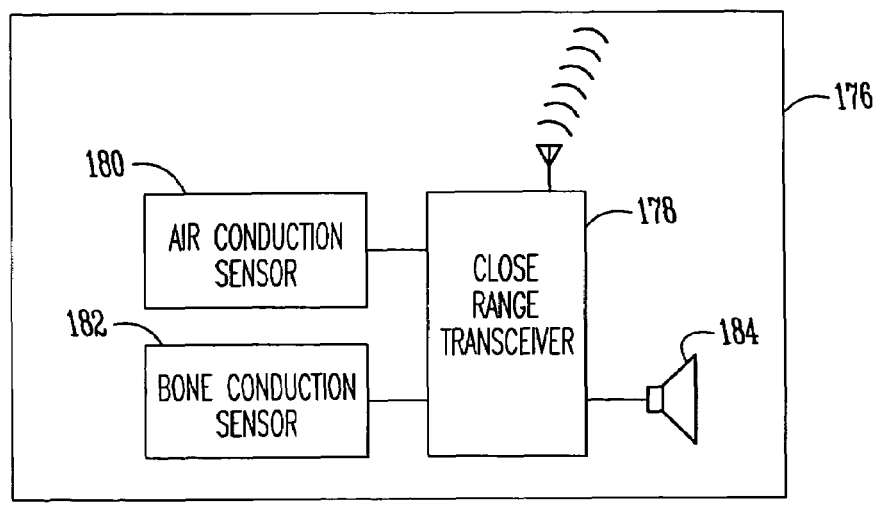
Fig. 26

PERSONAL COMMUNICATIONS DEVICE

CROSS REFERENCE TO RELATED APPLICATIONS

The present application claims priority to and is a continuation-in-part of U.S. application Ser. No. 10/368,924, filed on Feb. 18, 2003, which is a continuation of U.S. application Ser. No. 09/846,789, filed on May 1, 2001, now U.S. Pat. No. 6,542,721, which is a continuation-in-part of U.S. application Ser. No. 09/587,743, filed on Jun. 5, 2000, now U.S. Pat. No. 6,408,081, which is a continuation in part of U.S. application Ser. No. 09/416,168, filed on Oct. 11, 1999, now U.S. Pat. No. 6,560,468.

BACKGROUND OF THE INVENTION

The present invention relates to personal communication systems. More specifically although not exclusively, the present invention relates to personal communication systems and methods of using such systems that provide for enhanced user interfaces and/or reconfigurability.

Problems in the Art

The present invention improves upon the device disclosed in U.S. Pat. Nos. 6,542,721 and 6,408,081, both to Peter V. Boesen, the present inventor. In addition, the present invention improves upon other personal communication systems in the art. Examples of such personal communication systems include devices which provide both PDA and voice transceiver functionality. In the past, these devices have been described as smart phones. In addition, these devices have been described as being third generation (3G) cell phones. Generally speaking, such devices provide for voice functionalities associated with cell phones as well as functions associated with PDA's or other handheld computers.

Some of these prior art devices include video cameras or other video imaging devices in order to take digital still pictures or videos. Typically these pictures or videos can then be wirelessly transmitted. The electronics and software required in such devices is generally well-known within the art and continues to improve. Nevertheless, such personal communication devices continue to have problems in their usability and user interface.

Therefore, it is a primary object, feature, or advantage of the present invention to improve upon the state of the art.

A further object, feature, or advantage of the present invention is to provide a personal communications device that is physically reconfigurable to provide different configurations to meet a user's particular preferences or better accommodate a user's specific use.

It is a still further object, feature, or advantage of the present invention to provide a personal communication device that includes both voice and video functionality.

Another object, feature, or advantage of the present invention is to provide a personal communication device that is easy to dial.

A further object, feature, or advantage of the present invention is to provide a personal communication device that allows video of a user operator to be acquired in a manner conducive to teleconferencing applications.

These and/or other objects, features or advantages of the present invention will become apparent from the specification and claims that follow.

SUMMARY OF THE INVENTION

The invention includes a personal communications device with improved user accessibility. According to one aspect of the present invention, a personal communications device for voice and video communications is provided. The device includes a first body having a display and a second body having a plurality of manual inputs. The first body is adapted for attachment to the second body. The personal communications device has an open position where the display of the first body and the manual inputs of the second body are accessibly exposed to face a user. The personal communications device has a closed position where the display of the first body is at least partially protected by the second body and the manual inputs of the second body are accessibly exposed to face the user. The handheld personal communications device also includes a video camera operatively connected to the second body so that when the device is in the closed position, the video camera faces the user and when the device is in the open position, the video camera faces away from the user.

According to another aspect of the present invention a personal communications device having a housing with a first body and a second body operatively connected to the first body is disclosed. The second body has a first side and an opposite second side. The first and second bodies have an open position, a first closed position, and a second closed position. The first side of the second body is openly exposed and the second side of the second body is adjacent the first body in the first closed position. The second side of the second body openly exposed and the first side of the second body is adjacent the first body in the second closed position. A voice transceiver disposed within the housing.

According to another aspect of the present invention, a personal communications device includes a housing formed from a first body, a second body, and a third body. The first body is operatively connected to the second body and the third body is operatively connected to the second body. There is a voice transceiver disposed within the housing. It is preferred that the bodies be connected using slideable hinges.

The present invention also provides that the handheld personal communications device can be combined with an earpiece preferably having a bone conduction sensor and a second close range transceiver for communication with the handheld personal communications device.

In addition, the present invention provides for the first body being removably attached to the second body. Thus, according to one method of the present invention, a device is provided having a first body having a processor operatively connected to a display, a plurality of buttons, a voice transceiver and a first close range transceiver, and a second body having a video imaging device operatively connected to a second close range transceiver, the first body removable from the second body. According to the method, the first body can be removed from the second body. Then a video image is acquired with the video imaging device and transmitted from the second body to the first body. The video image can then be displayed on the display of the first body.

BRIEF DESCRIPTION OF THE DRAWINGS

FIG. 25 provides a block diagram of one embodiment of a communications system.

FIG. 26 provides a block diagram of another embodiment of a system of the present invention where a first body is separated from a second body.

DETAILED DESCRIPTION OF THE PREFERRED EMBODIMENT

The present invention will be described as it applies to various preferred embodiments. It is not intended that the present invention be limited to the described embodiments. It is further to be understood that all features may not be present in each embodiment shown, it is to be understood that features of various embodiments can be combined. It is intended that the invention cover all modifications and alternatives which may be included within the spirit and scope of the invention.

Figure 1:
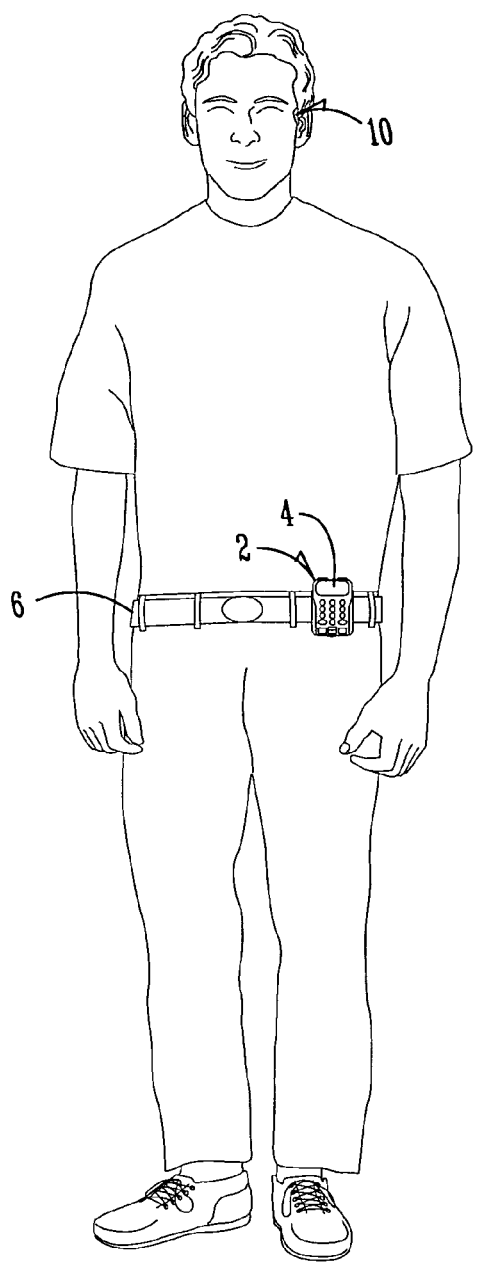
FIG. 1 is a diagram of a personal communications device worn by a person according to the present invention.

FIG. 1 shows the personal communications device 2 of the present invention as worn by a person. The personal communications device as shown has a display 4 such as in a standard telephone transceiver. The device may be worn on a belt 6 as shown or may be placed in a pocket or may be carried by the person. Another addition to the system includes the earpiece 10 worn by the person.

Figure 2:
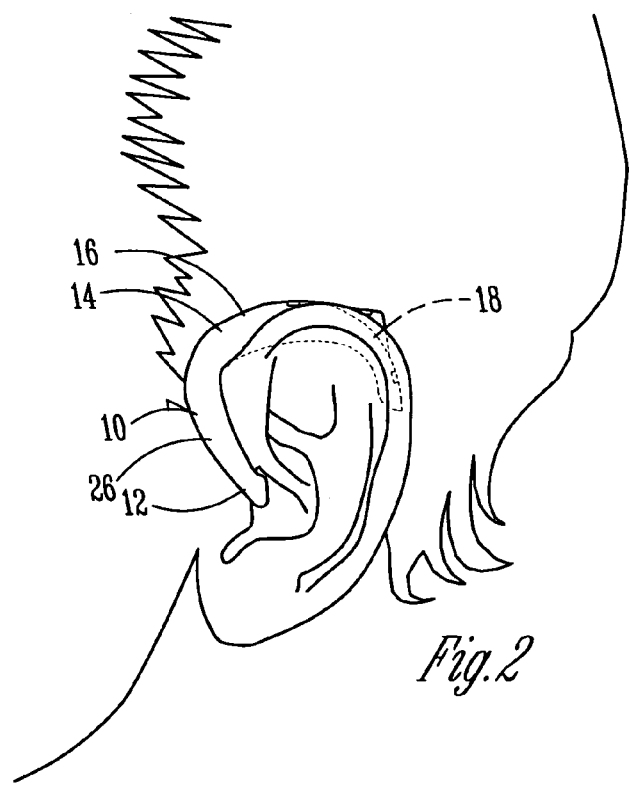
FIG. 2 is a representation of the earpiece of the present invention fitted on the ear.

FIG. 2 shows a pictorial representation of the earpiece 10 as worn in a person's ear. The earpiece has an external ear canal portion 12 which is fitted within the ear. The earpiece 10 has an ear attachment portion 14 fitted around the ear. The earpiece 10 in its preferred form houses a processor 16 and a transceiver 18.

Figure 3:
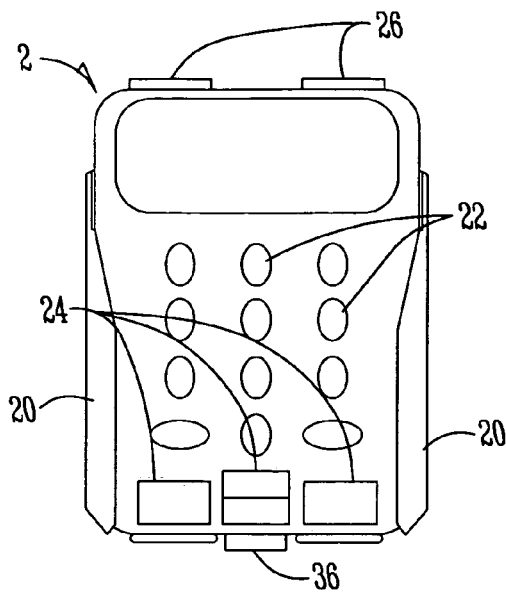
FIG. 3 is a diagram of the layout for the personal communications device of the present invention in a closed position.

FIG. 3 is a diagrammatic representation of one embodiment of the personal communications device 2 of the present invention. In FIG. 3, the personal communications device 2 has a clip 20. The clip 20 is used to attach the personal communications device 2 to a belt or pocket. The personal communications device 2 also has a keypad 22. The keypad 22 may be a standard 12 key keypad such as typically used on telephones and cellular telephones, or other configuration of a dial pad. The present invention contemplates that additional function buttons 24 or other inputs may be used to provide additional functionality to the personal communications device 2. The personal communications device 2 may have a hinge 26. The hinge 26 permits the personal communications device 2 to open. The opening of the personal communications device 2 may be facilitated by an open button 36. The open button may be spring loaded or may be otherwise constructed to cause the personal communications device 2 to open upon depression and/or release of open button 36.

It is to be further appreciated that the open button 36 need not be mechanically connected to the hinge 26. The open button 36 may simply be a button causing a digital signal change when pressed and/or released. The personal communications device 2 monitors the button's digital signal and when the open button signal changes an actuator is activated that opens the personal communications device 2. The present invention contemplates this and other variations whereby a user can conveniently open the personal communications device 2 through use of a switch, button, latch, hook, or other physical means that is operated manually by a user or through voice activation or other electronic control.

Figure 4:
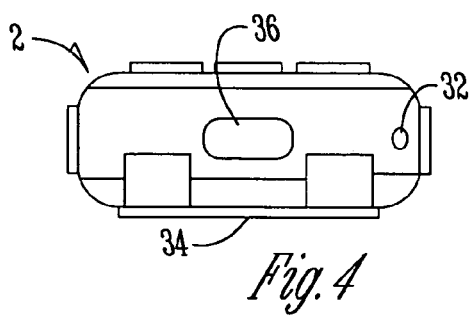
FIG. 4 is a view of the personal communications device of the present invention in a closed position.

FIG. 4 shows a view of the bottom of the personal communications device 2. The personal communications device 2 may include an access port 32 and/or a vibration module 34. The access port 32 is used to provide additional functionality and communication capability. The access port 32 may be a serial interface port such as for RS232 serial or USB. The access port 32 may be an ethernet port, a fire wire port, an infrared port conforming to the IrDA standard or other infrared standard. Wireless interfaces such as BLUETOOTH may also be used to provide access. The present invention contemplates that other types of interfaces may be used as may be known in the art.

The vibration module 34 is used to add tactile alert functionality to a personal communications device 2. The vibration module 34 may contain one or more vibration motors. Preferably, the vibration motor is both small and low power. The personal communications device 2 can be used as a pager or as a telephone, and when incoming calls or notifications are received, the vibration module 34 can vibrate to alert the user of the message. The present invention also contemplates that the vibration module 34 can be used to alert the user of electronic messages or other events such as may be useful or desirable for the user to immediately be made aware of. For example, the vibration module 34 may be activated by software executing on an intelligent control housed within the device 2. Thus alarms may be set for any purpose including notifying a person of appointments, other reminders, incoming messages, or other reasons that may be useful or otherwise desirable.

Figure 5:
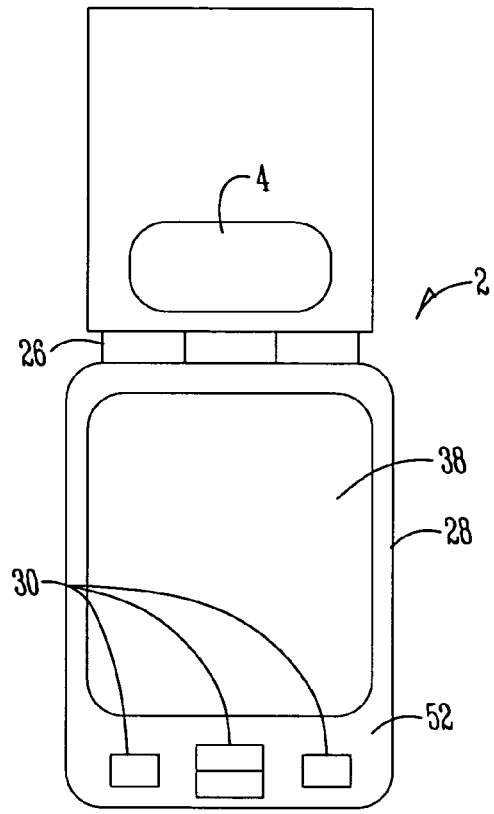
FIG. 5 is a top view of the personal communications device of the present invention in an open position.

FIG. 5 shows one embodiment of the personal communications device 2 of the present invention in an open position. One or more hinges 26 are opened to provide access to the body 28 of the personal communications device 2 having a display. The body 28 may include a display, such as, but not limited to a touch screen 38 as well as additional buttons 30 to add more functionality to the personal communications device 2. The personal communications device 2 may also have a transceiver 52 available. The use of transceiver 52 will be further explained in the context of the invention.

The personal communications device 2 includes a housing formed from a plurality of bodies. There is an intelligent control disposed within at least one of the bodies.

The intelligent control housed within the device 2 may be a processor, an embedded computer or other device. For example, the intelligent control may run Microsoft Windows, Microsoft Windows CE, the Palm OS, or other operating systems. The present invention is in no way limited by the type of processor or other intelligent control used, the operating system used, or other variations. The device 2 may be used for sending e-mail, taking notes, organizing one's schedule, web browsing, performing calculations, or any other function associated with a communications device, PDA, or computer. The device 2 may include handwriting recognition functionality as may be known in the art. Examples of handwriting recognition software for Windows CE include ParaGraph's CALLIGRAPHER handwriting recognizer and Microsoft's TRANSCRIBER software. The device 2 may also include specialized software. For example, when the device runs Windows CE, the software applications may be written in Microsoft Visual C++ or Microsoft Visual Basic or with any other computer language or software development tool. When the earpiece includes a bone conduction sensor, air conduction sensor, and a stereo transceiver, and the personal communications device 2 includes a stereo transceiver as well, an intelligent control disposed within the housing of the device 2 can be programmed to receive the stereo signals and perform processing to improve the speech signal. In addition, the device 2 may execute voice recognition software so that when voice information is received, whether it be stereo or mono audio signals, the voice information may be used to control the device 2 for any number of operations, including dialing operations or other operations associated with phone calls. In addition, the voice software associated with the device 2 may be used in conjunction with audio received over a voice transceiver, or a short or close range voice transceiver.

Figure 6:
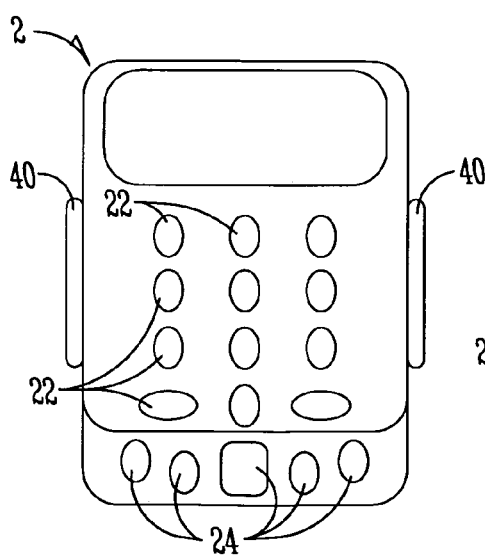
FIG. 6 is a top view of the personal communications device of the present invention in a closed position.

FIG. 6 shows another embodiment of personal communications device 2. In FIG. 6 one of the bodies of the personal communications device 2 has a keypad keys 22 and also additional function buttons 24 available. It should be understood that the personal communications device 2 includes a voice transceiver, such as one compatible with one or more radio telephones, cellular telephones, satellite telephones, and other types of voice communications standards. The present invention allows for the electronics associated with providing various functions to be distributed throughout the entirety of the housing. A release button 40 may be used to cause the personal communications device 2 to open. The release buttons 40 may be located on the side of the personal communications device 2.

Figure 7:
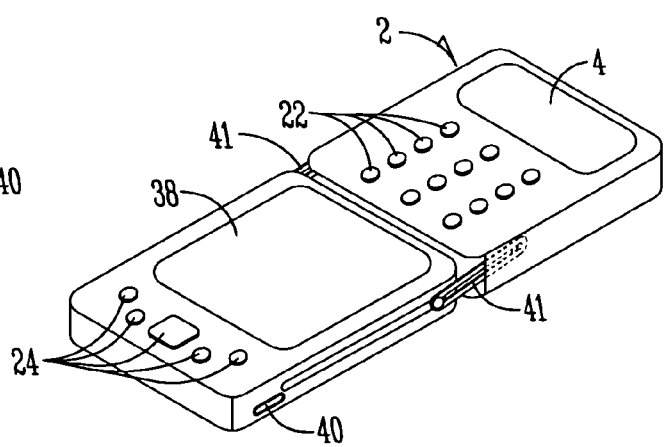
FIG. 7 is a diagram of the personal communications device with a slide hinge.

FIG. 7 shows the personal communications device 2 in an open position. The personal communications device 2 opens in a manner such that both the first body of the device and the second body of the device are both accessible at the same time. The present invention contemplates that this functionality may be accomplished in numerous ways. For example, a slide hinge 41 is shown. The slide hinge 41 allows a first body of personal communications device 2 to slide past a second body of the personal communications device 2, so that both user interface elements associated with the first body and user interface elements associated with the second body are accessible at the same time. This configuration also permits the display 38 to be protected when in a closed position. More than one slide hinge may be used, such as a slide hinge 41 on each side of the device as shown. The present invention further contemplates that the buttons 24 need not be accessible such that the first body completely covers the second body when in a closed position.

Figure 8:
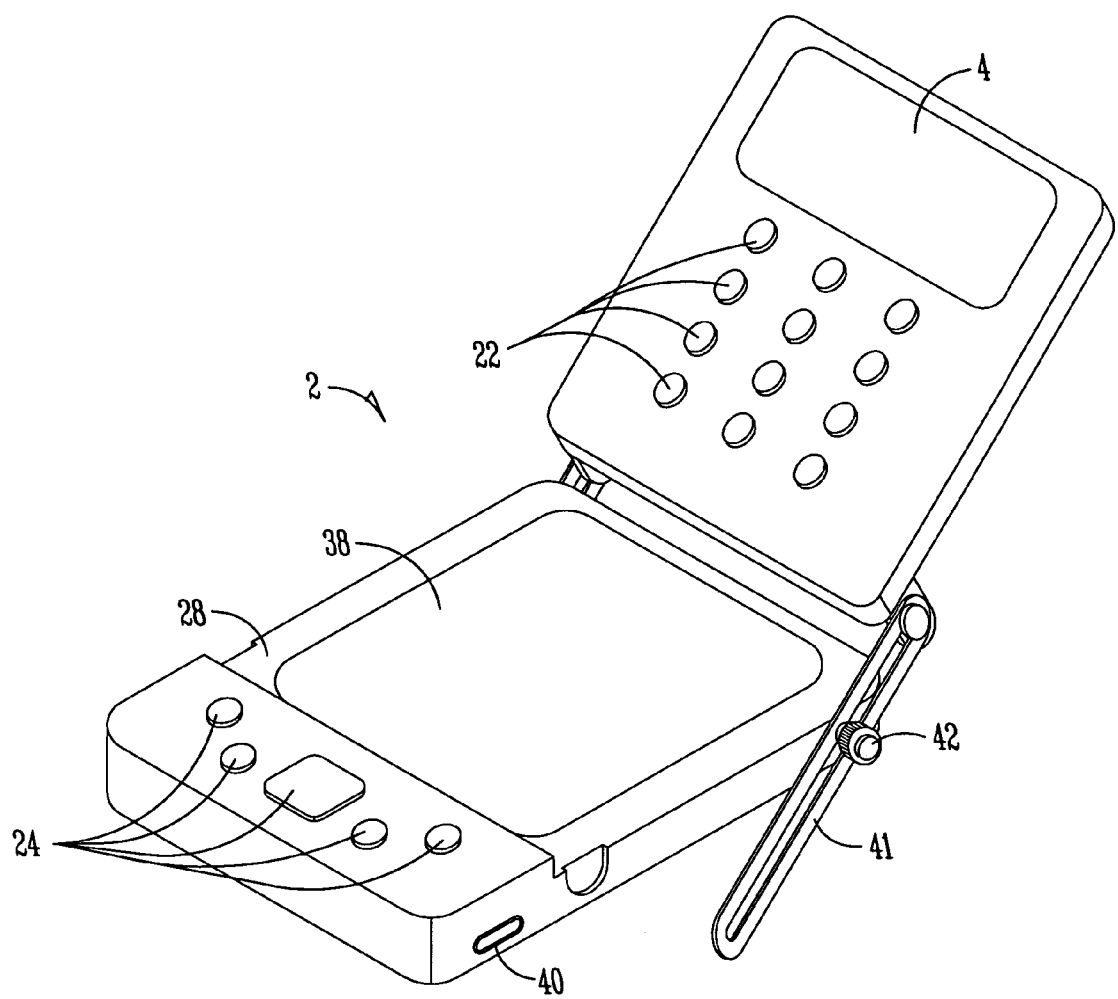
FIG. 8 is a diagram of the personal communications device with the telephone transceiver portion positioned at an angle relative to the PDA portion.

FIG. 8 shows the personal communications device 2 with a slide hinge 41. As shown, hinge 41 permits the first body of the personal communications device to open such that both the dial pad buttons 22 and the top surface of the second body 28 are available at the same time. A knob or button 42 may be used to secure the position of the slide hinge 41. The present invention permits the angle of the first body relative to the second body 28 to be adjusted.

Figure 9:
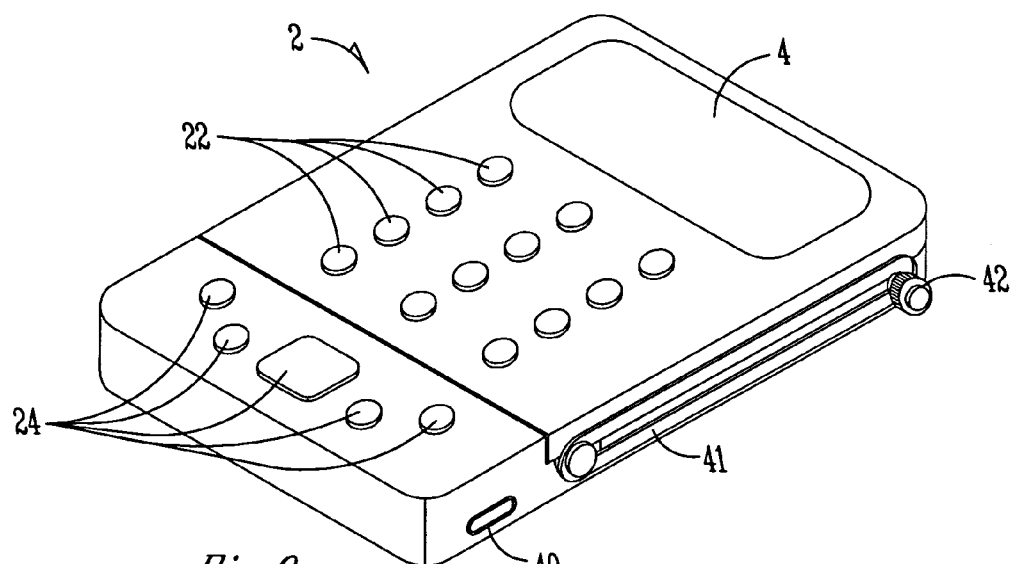
FIG. 9 is a diagram of the personal communications device in a closed position.

FIG. 9 shows the personal communications device 2 in a closed position. When in a closed position, the dial pad buttons 22 are still available and the display 4 is also viewable. In addition, the buttons 24 are also available as well.

Figure 10:
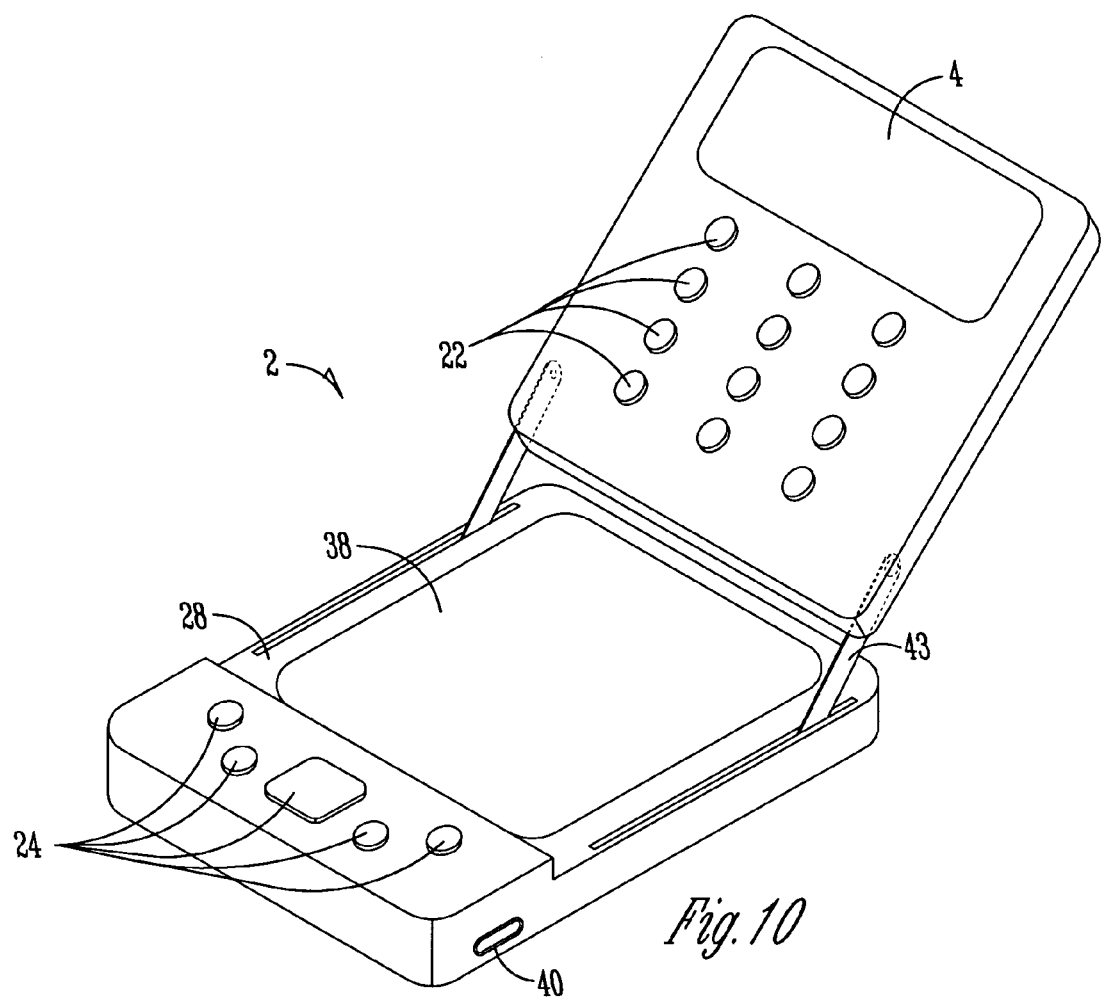
FIG. 10 is a diagram of a hinged embodiment of the personal communications device in an open position.
Figure 11:
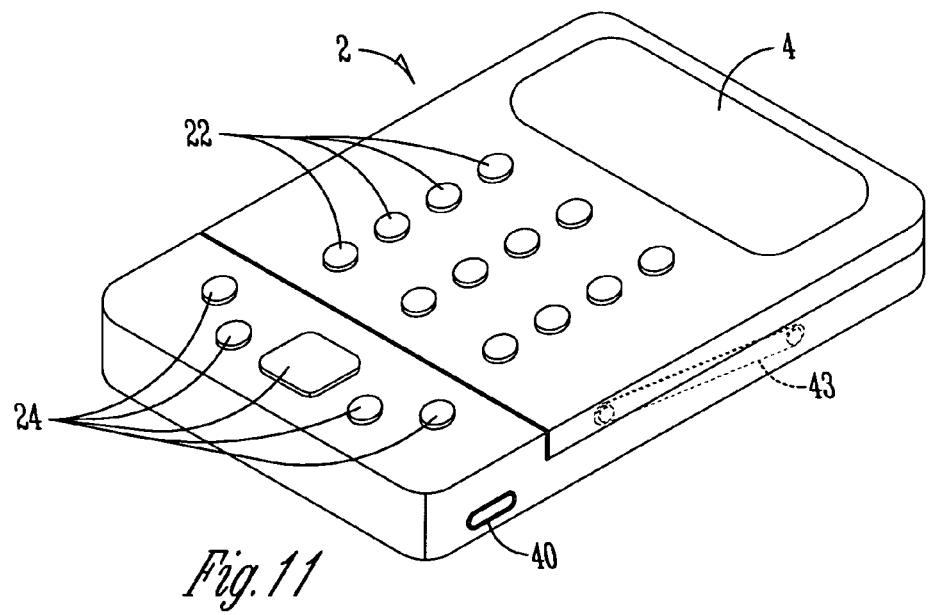
FIG. 11 is a diagram of a hinged embodiment of the personal communications device in a closed position.

FIGS. 10 and 11 show the personal communications device 2 with an interiorly mounted slide hinge 43. The present invention contemplates that the angle between the first body and the second body 28 is adjustable through altering the position of the interiorly mounted slide hinge 43 or pivoting on the pivot points of the interiorly mounted slide hinge 43.

The present invention also contemplates that a lateral hinge may be used. The lateral hinge allows the personal communications device 2 to be opened in a manner such that both the user interface elements of the first body and user interface elements of the second body are accessible at the same time. The present invention also contemplates other variations such as one or more slide hinges, lateral hinges, collapsible hinges, slide joints, lateral joints or similar mechanisms. The present invention also contemplates that a ratchet mechanism may be built into a hinge or otherwise used to open the personal communications device 2. Using a ratchet mechanism or other device, the personal communications device is constructed in a manner that permits the personal communications device 2 to be opened at various angles. For example, the personal communications device 2 may be opened at a full 180° angle between the first body and the second body. In addition, other angles may be used such as 60°, 90°, 120°, 150°. This permits additional flexibility for the user in that a display associated with one of the bodies may be better viewed, keys may be more easily accessed, glare on the display may be eliminated or reduced, an angle associated with a video sensor or camera can be better adjusted, or for other reasons that a particular use or environment may suggest.

It should be readily apparent that the present invention may be implemented in a number of different ways with regards to the specific construction techniques used to allow the device to open in a manner such that various user interface elements of the device 2 are accessible when the device is in an open position. As previously discussed, a ratchet wheel can be used with inner teeth for compact assembly or outer teeth. Motorized opening and closing is also facilitated with the motorized operating of the ratchet wheel. When a ratchet mechanism is used there may be multiple pawls placed side by side for finer adjustment of the angle of the first body relative to the second body. In addition, a flexible coil can be used, the flexible coil allowing the position of the first body to be adjusted with respect to the second body. The first body may slide into position. The slide mechanism may be located on the side of the device and may include slots along the side of the device or other implementation. In addition, the device may be configured such that the first body is slidably mounted to the back or interior of the second body or the second body is slidably mounted to the back or interior of the first body.

Figure 12:
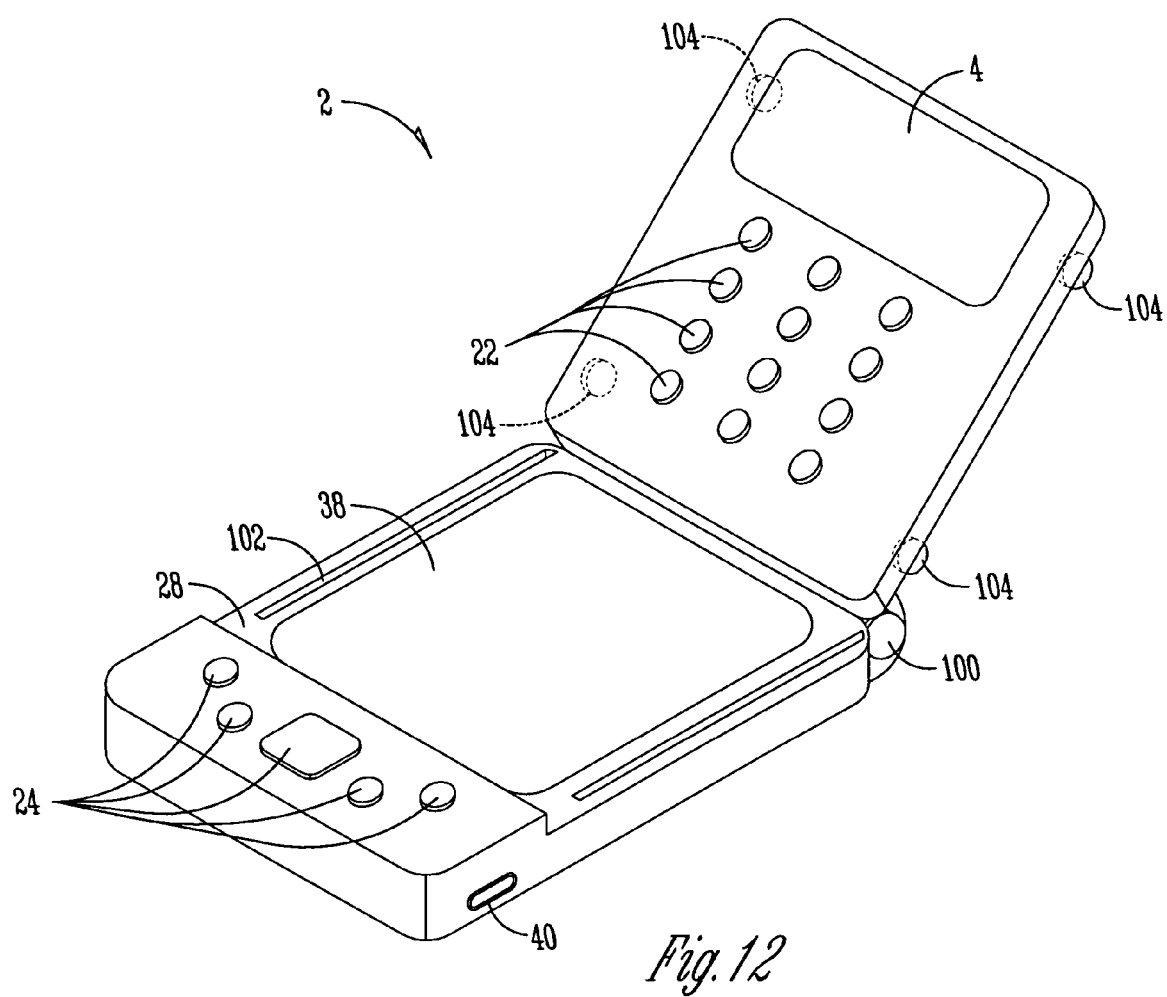
FIG. 12 is a diagram of a personal communications device according to another embodiment of the invention.

FIG. 12 illustrates another variation of the present invention. In FIG. 12, the personal communications device 2 is shown. The first body has a plurality of wheels or rollers 104. These rollers are adapted to fit within the track 102. The present invention contemplates that the track may shallow near the top most portion of the track. The rollers 104 permit the first body of the personal communications device 2 to be slidable and/or glidable in order to permit separation from the second body of the personal communications device 2 in a manner that provides a user with access to both the buttons 22 on the first body and a display 38 associated with the second body. Motorized function also facilitates these same actions. Once the first body slides past the second body it may lock in place. The first body may lock in place to a spring hinge 100. The spring hinge 100 allows the tilt position of the first body relative to the second body to be adjusted.

Figure 13:
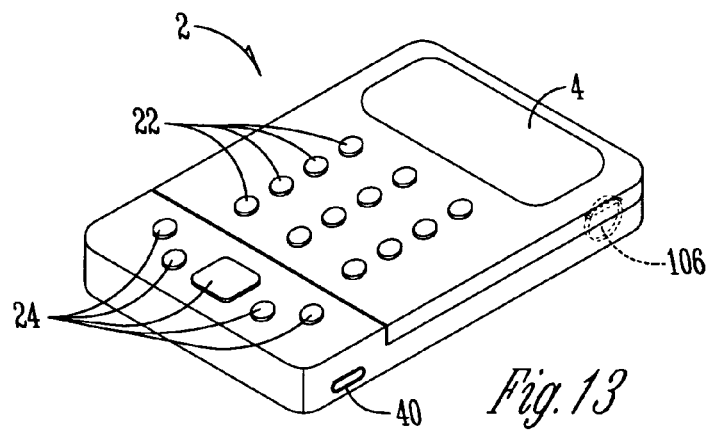
FIG. 13 is a diagram of a slidably mounted personal communications device of the present invention in closed position.
Figure 14:
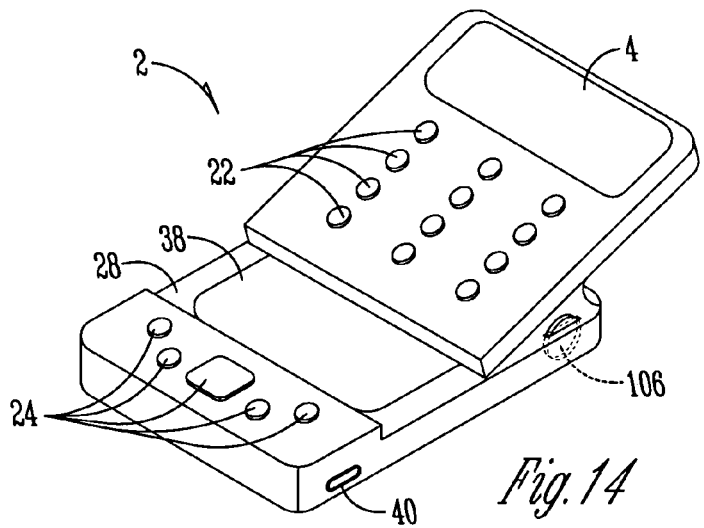
FIG. 14 is a perspective view of one embodiment of a slidably mounted personal communications device of the present invention in a tilted position.
Figure 15:
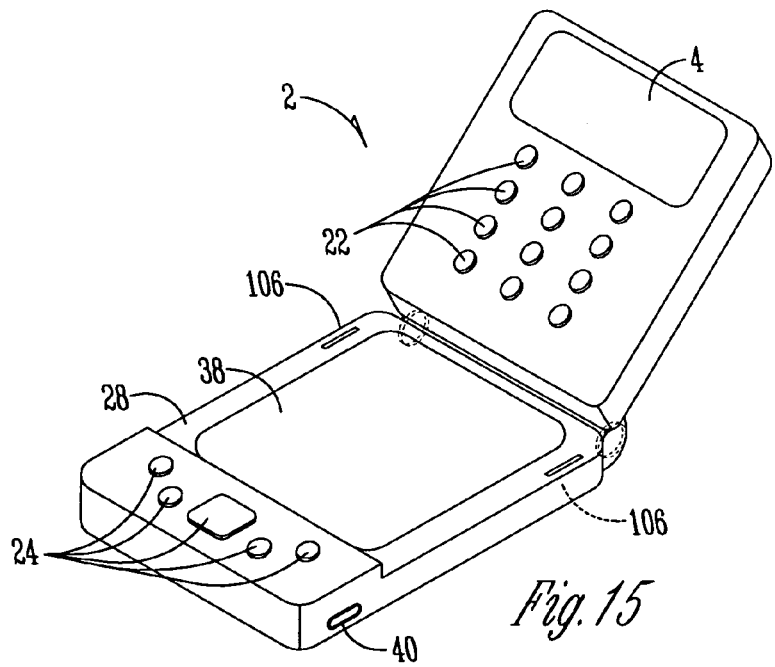
FIG. 15 is a perspective view of one embodiment of a personal communications device of the present invention in another tilted position.

Another variation on the present invention is shown in FIGS. 13 through 15. In FIG. 13 the personal communications device 2 is shown in a closed position. In FIG. 13 there is an adjustment mechanism 106. In FIG. 14 the first body is slid through a track slot or other structure in an angled manner. This action is facilitated either manually or through motorized activation, or other forms of electronic actuation. As shown in FIG. 15, once the telephone transceiver portion has been slid past the adjustment mechanism 106, the adjustment mechanism 106 is depressed into the body of the second body. Once the first body has been slid past the adjustment mechanism 106, the second body may be pivoted to a desirable viewing angle. The present invention contemplates that numerous mechanisms may be used in a similar fashion to permit the first body to upwardly slide along the second body to a point where it will be adjustable. Electronic actuation, including motorized functionality allows facilitation of the same action.

Figure 16:
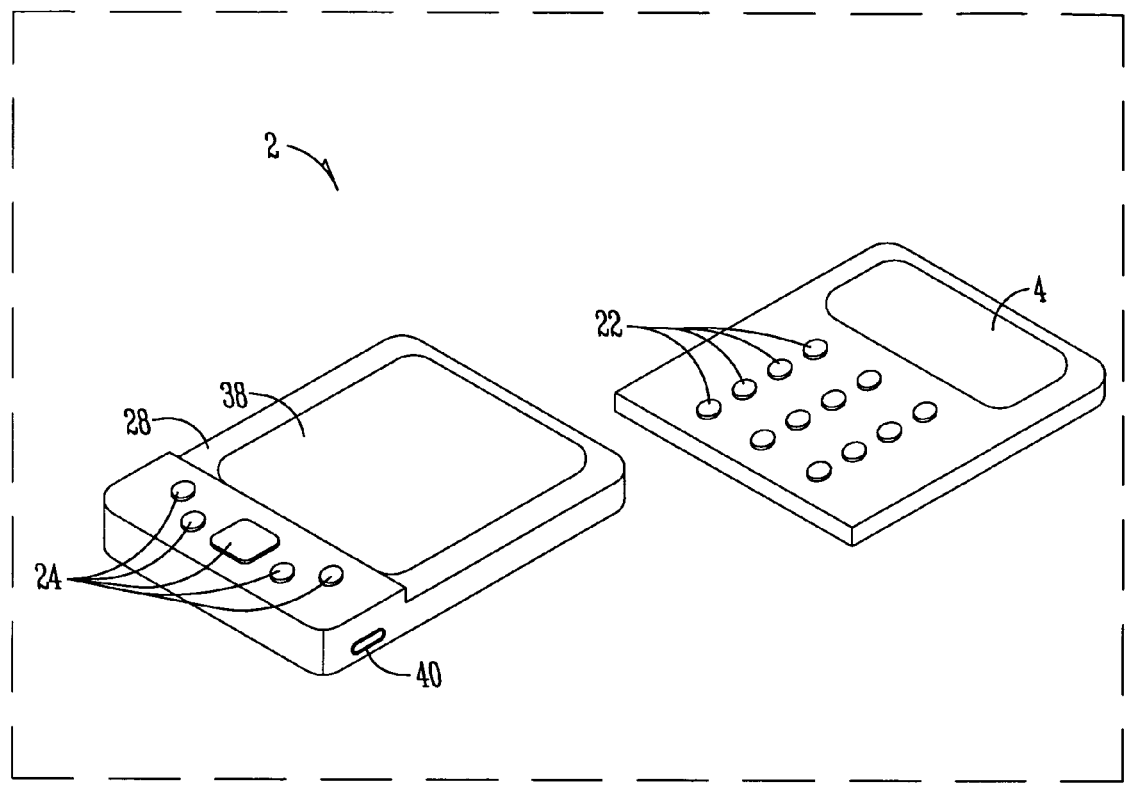
FIG. 16 is a perspective view of one embodiment of a removeably mounted personal communications device.
Figure 17:
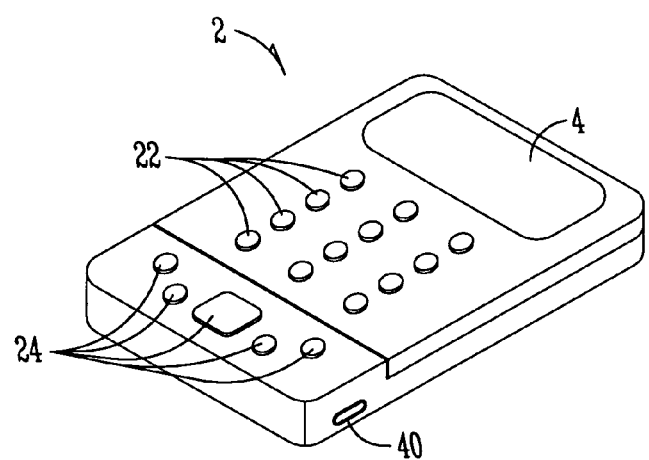
FIG. 17 is a perspective view of one embodiment of a removeably mounted personal communications device in a docked position.

In FIG. 16, the first body is removeably attached to the second body. The present invention contemplates that the second body and the first body may communicate wirelessly through any number of wireless protocols and standards. This physical arrangement allows a user to access both the display 38, the buttons 24, the dial pad buttons 22 and a secondary display simultaneously. In FIG. 17, the first body is fitted onto the second body. The present invention contemplates that the first body may be locked into place on the second body 28 or otherwise secured in any number of ways. The present invention also contemplates that when in a locked position, the first body may be in direct electrical connection with the second body 28 to provide for the charging of batteries in the first body, the exchange of information between the first body and the second body 28, or for other uses. A short range or close range transceiver, such as BLUETOOTH transceiver is preferably disposed within both the first body and the second body 28 to facilitate communication between the first body and the second body 28 when the first body is removed from the second body 28.

Figure 18:
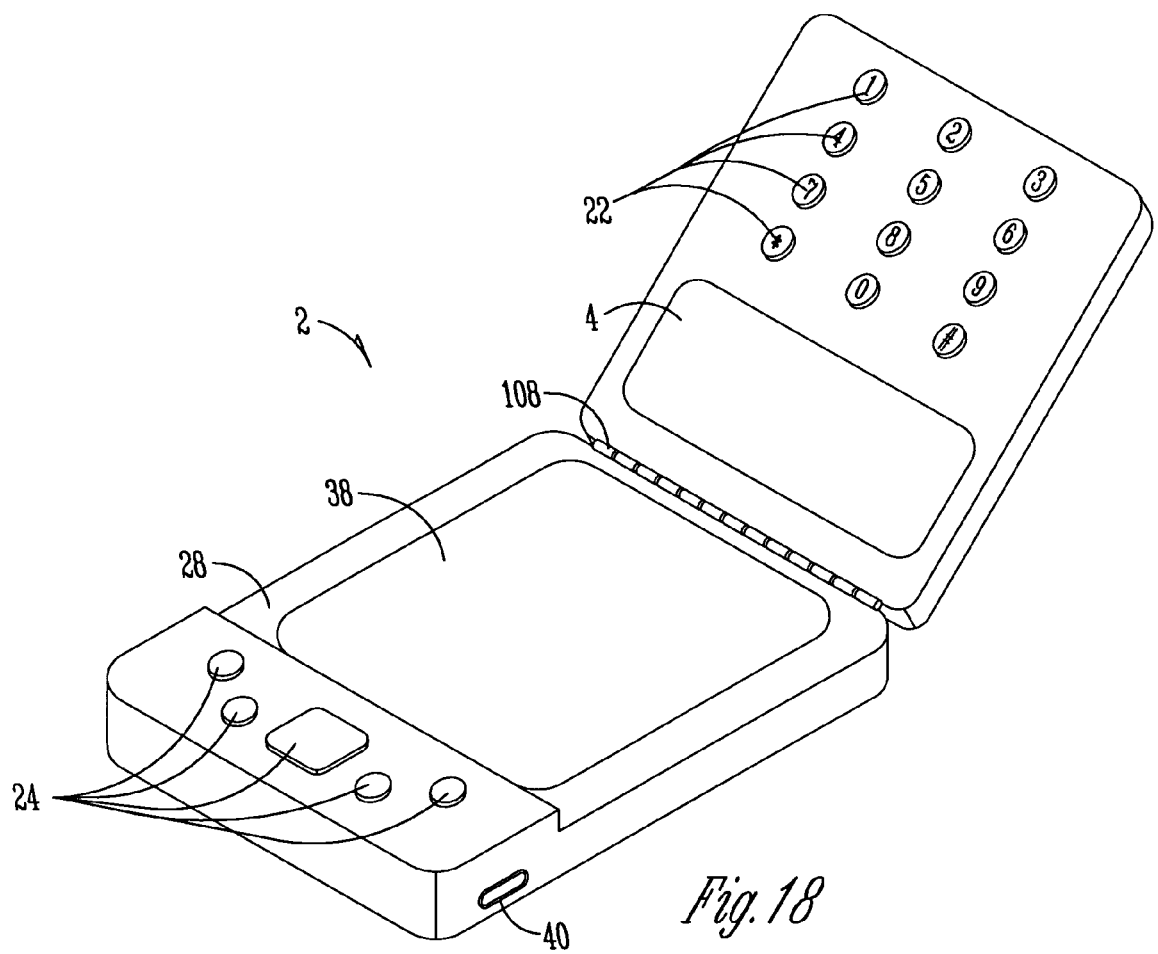
FIG. 18 is a perspective view of one embodiment of a personal communications device having one or more displays and buttons accessible on each side of the device.
Figure 19:
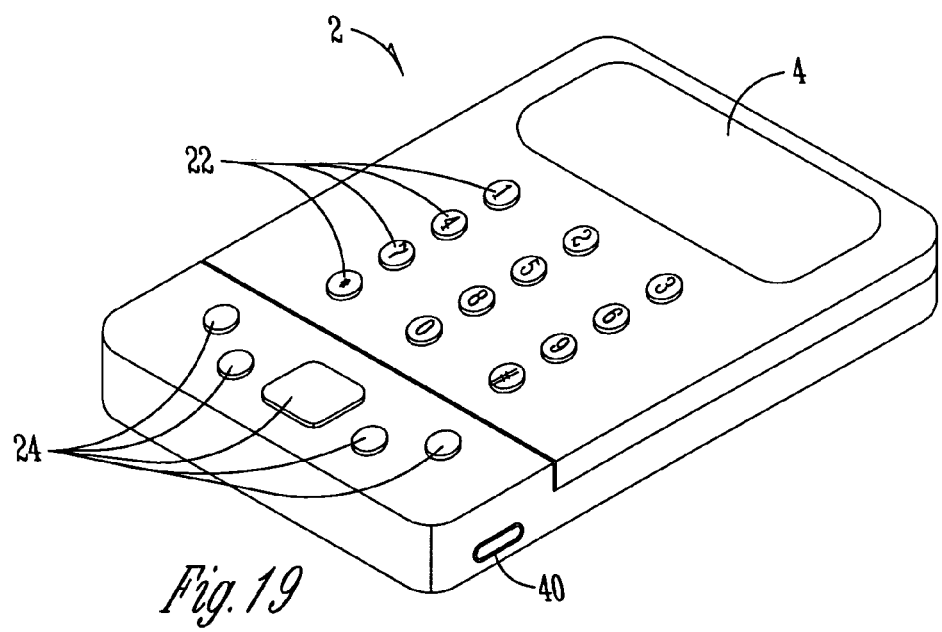
FIG. 19 is a perspective view of one embodiment of the personal communications device of FIG. 18 in a closed position.

FIGS. 18 and 19 show another variation of the present invention that provides a user simultaneous access to various user interface elements. In FIG. 18, a hinge 108 is used. The hinge 108 shown is a standard hinge such as may be used in a flip phone or other device. Dial pad buttons 22 are accessible from either side of the device. This can be accomplished in multiple ways. For example, two sets of buttons can be used where the buttons share an electrical contact. Alternatively, two sets of buttons can be used, each set of buttons having its own set of contacts. In this variation, the display 4 may be a transparent display. This permits the display to be viewed from either side. It is to be understood that the function of the buttons as well as the display on the screen may need to be reversed or mirrored depending upon the context of the use of the device. For example, when the hinge 108 is in an open position than the display will provide a mirror image of the display image when the personal communications device 2 is in a closed position. The present invention also contemplates that instead of having a single transparent display, there may be two displays, one on each side of the telephone transceiver portion and both separate and distinct from a larger display associated with the second body. In addition the present invention contemplates that instead of a display, a see through material such as a plastic material may be used. When in a closed position, a user can see display information through the clear plastic that is displayed on the display 38. When in an open position, the user can also still see the display 38. In this manner, the user has access to user interface elements associated with a voice transceiver, and the display 38 at the same time. In addition, the user can always see at least a portion of the PDA display 38 regardless of whether the personal communications device 2 is in an open position or a closed position if a transparent display is used. Either manual operation or electronic actuation, including motorized functions allow for the opening and closing of the device.

Figure 20:
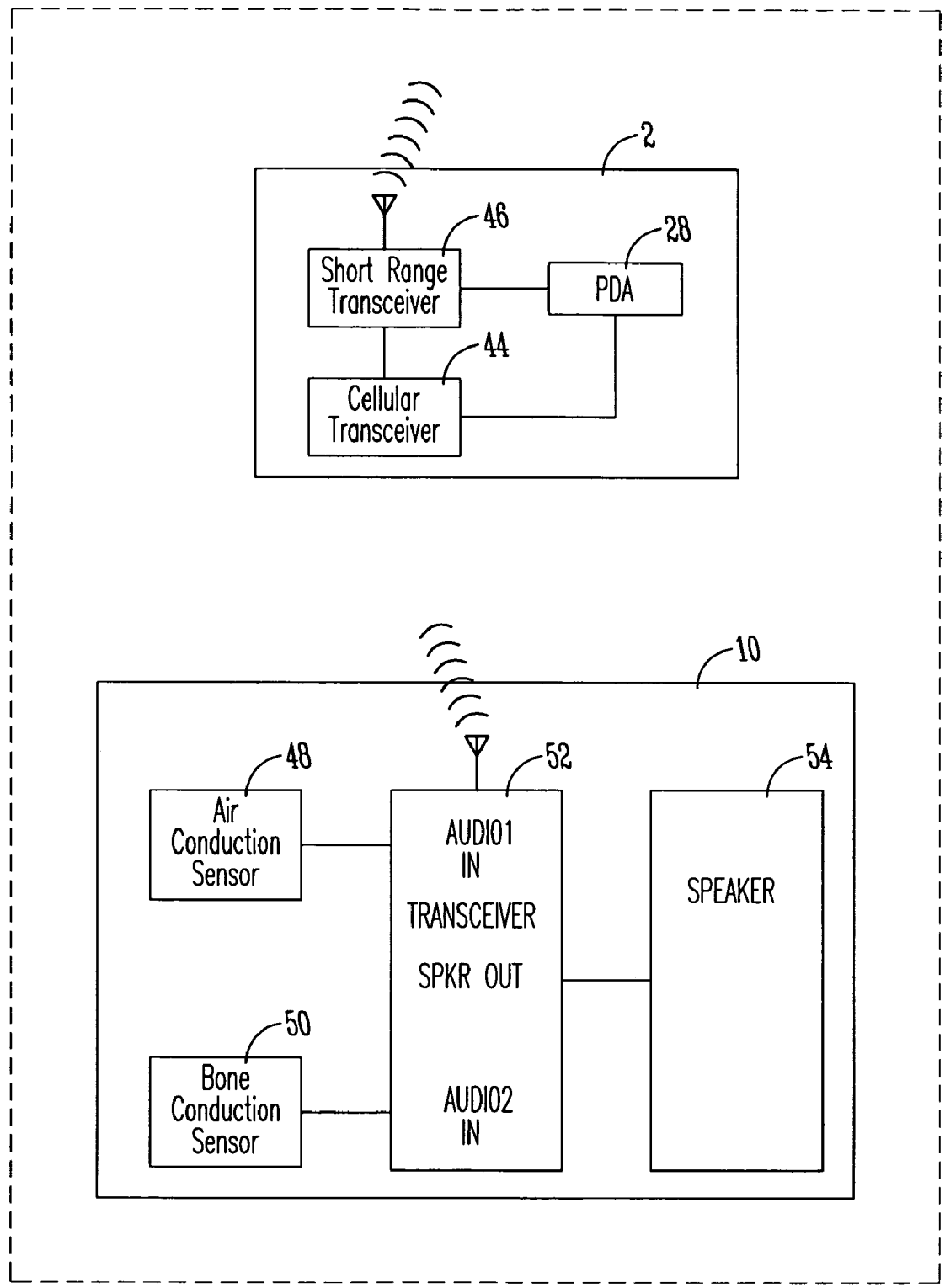
FIG. 20 is a block diagram of one embodiment of a personal communications device in wireless communication with an earpiece.

FIG. 20 illustrates a block diagram of one embodiment of the present invention. In FIG. 20, there is a personal communications device 2 having a short range transceiver operatively connected to a voice transceiver 44. There is also an earpiece 10 in operative communication with the personal communications device 2. The earpiece 10 includes a transceiver 52 operatively connected to an air conduction sensor 48 and a bone conduction sensor 50. There is a speaker 54 also operatively connected to the transceiver 52.

Figure 21:
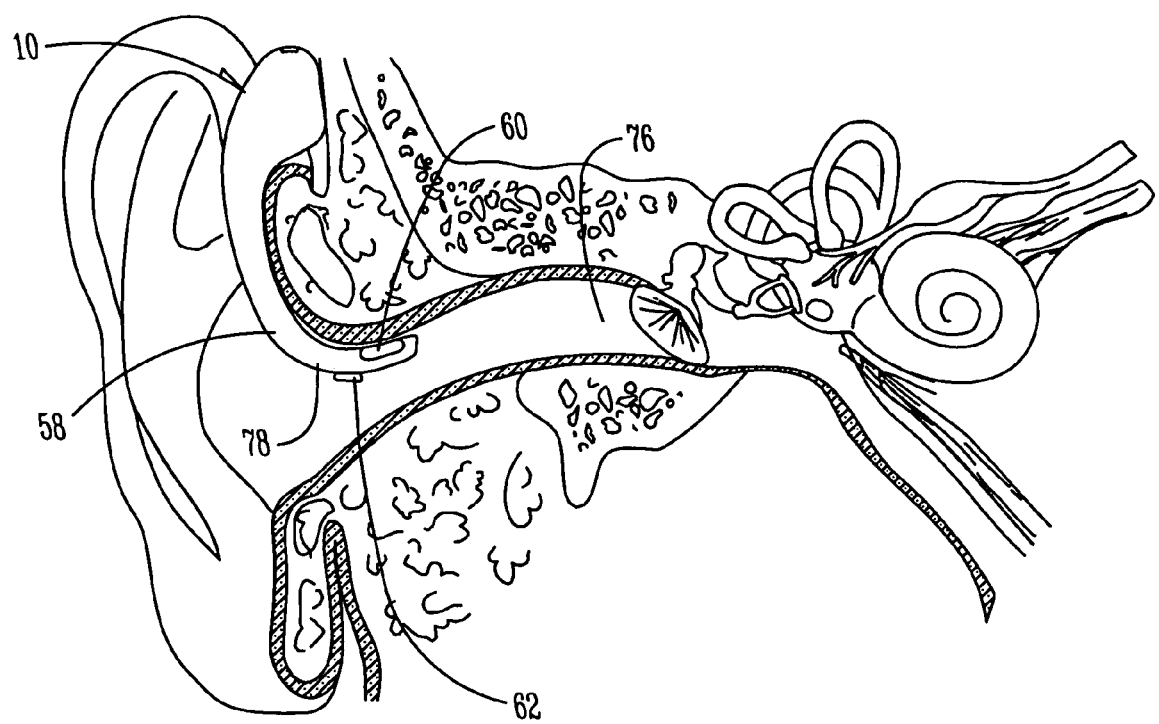
FIG. 21 is a diagram of the earpiece of the present invention fitted within an ear.

FIG. 21 discloses an example of one embodiment of an earpiece 10 of the present invention. The earpiece 10 is designed to be worn at the ear. As shown in FIG. 21, an external canal portion 58 of the earpiece 10 is positioned in the external auditory canal 76. The external auditory canal portion of the earpiece includes a bone conduction sensor 60 and an air conduction sensor 62 located on a resilient member 78.

The present invention contemplates that the earpiece need not include a speech processor or other processor within the circuit portion 58 of the device. The earpiece need only include a speaker, a bone or air sensor microphone, and transceiver. Use of the earpiece with a bone conduction sensor 60 and an air conduction sensor 62 improves the quality of the sound. Where processing capabilities are not included within the earpiece 10, both a bone conduction sensor and an air conduction sensor can still be used. For example, the transceiver used may be a stereo transceiver. This permits two channels of audio signals to be simultaneously transmitted. An intelligent control within the device may then perform speech processing as required, instead of or in addition to speech processing occurring within the earpiece. By permitting the personal communication device 2 rather than a portion of the earpiece to perform this processing, the size of the earpiece may be further reduced.

Figure 22:
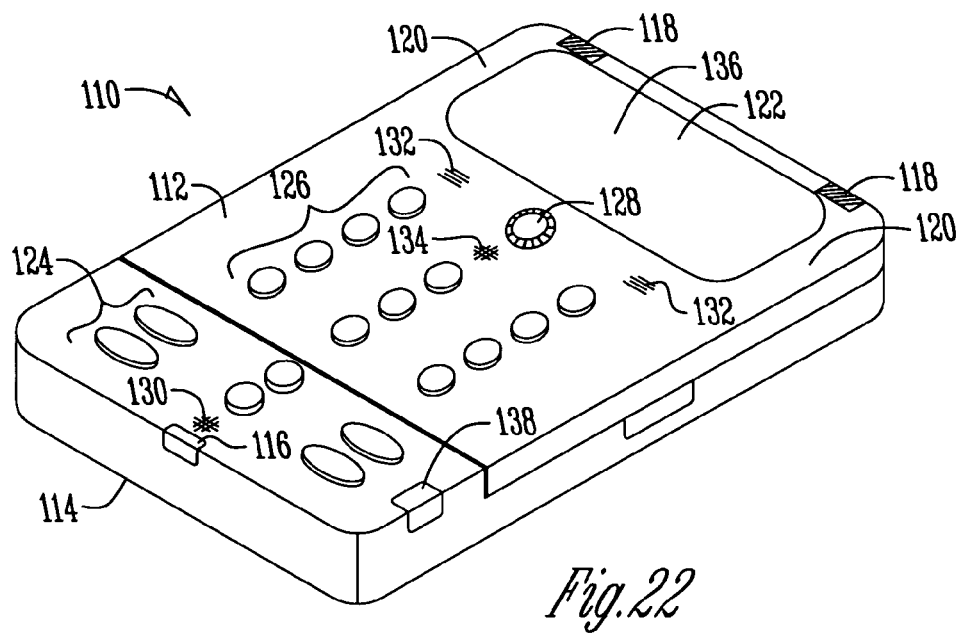
FIG. 22 provides a perspective view of one embodiment of a personal communication device of the present invention with a video sensor in a closed position.

FIG. 22 illustrates another embodiment of a personal communication device of the present invention. The device 110 includes a first body 112 and a second body 114. A button 116 is shown that is used to release the first body 112 from the second body 114. The button 116 can, for example, release a latch or other fastening device or mechanism so that the device 110 can transition from the closed position shown in FIG. 22 to an open position. The mechanism can be electronically actuated or manually controlled. A pair of hinges 118 is shown in the embodiment shown in FIG. 22. The first body 112 as shown opens outwardly. The first body 112 includes edges 120 on opposite sides of the first body 112. Between the edges 120 is either a void, a secondary display 122, or a transparent protective screen.

The second body 114 includes a plurality of manual inputs 124. The first body 112 also includes a plurality of manual inputs 126. Preferably, the plurality of manual inputs 126 includes at least a standard 12 key (or more) dial pad. Also shown as operatively connected to the first body 112, is a video imaging device or video sensor 128. The video sensor 128 can be a CCD camera or other type of video camera or video imaging device. The device 110 includes microphone 130 on the second body 114 and microphone 134 on the first body 112. In addition, speakers 132 are shown on the first body 112. Also, a button 138 is shown on the second body 114. The button 138 can be used for taking digital imagery.

The structure shown in FIG. 22 provides a number of advantages. First, although the device is in a closed position, the display 136 is at least partially protected by the first body 112. In addition, the display 136 is still viewable even though the device 110 is in a closed position. Also, the structure of the device 110 of FIG. 22 allows for the telephone to be dialed even though the device 110 is in a closed position. It should also be recognized that the structure of device 110 allows the video sensor 128 to take digital snap shots or images or live video of a user or operator of the device 110. Thus, a user can use the device 110 for video conferencing. A user can simply hold the device 110 in front of them and by doing so they can both see video transmitted from another party while allowing the video of themselves to be acquired for transmission. Thus, a user can use the device 110 for video conferencing even though device 110 is in a closed position.

Figure 23:
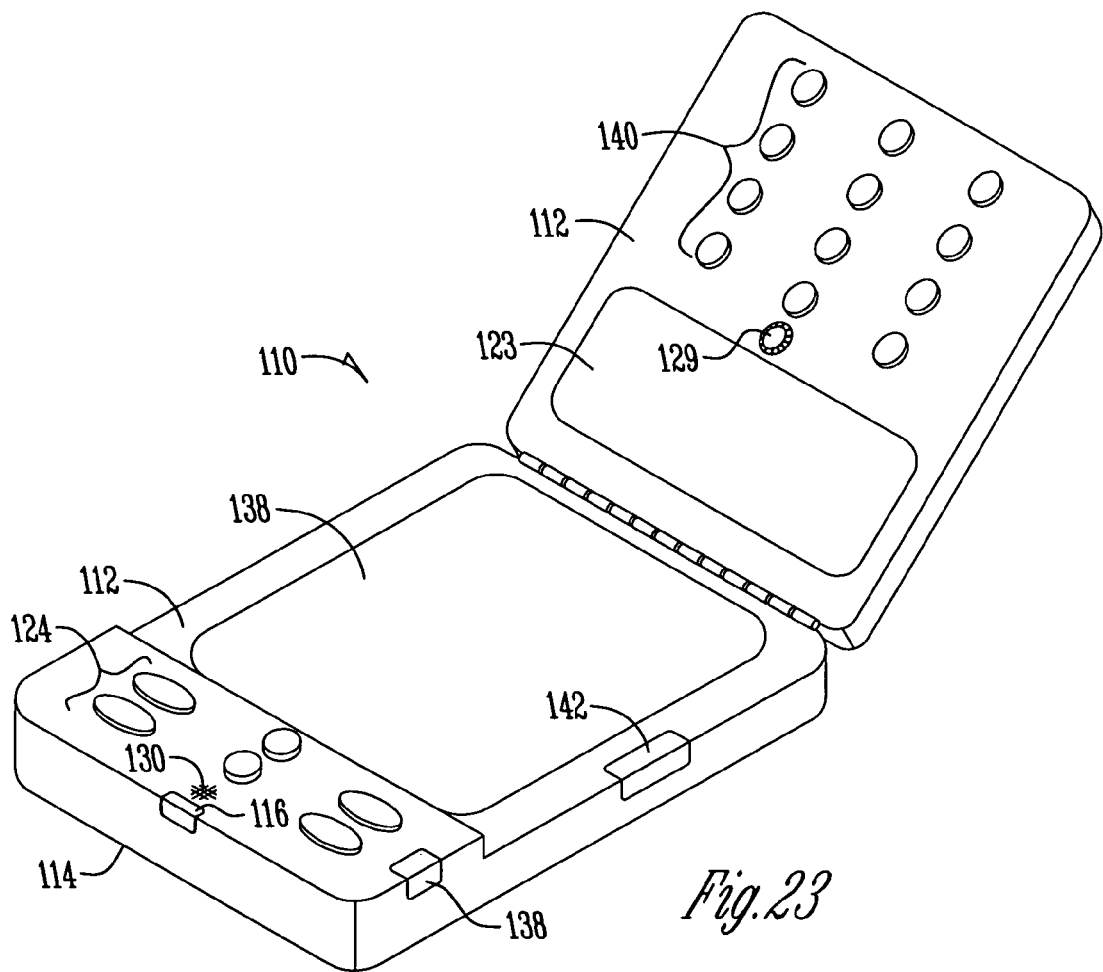
FIG. 23 provides a perspective view of the personal communication device of FIG. 22 in an open position.

FIG. 23 illustrates one embodiment of a device of the present invention in an open position. In this embodiment, the device opens outwardly and upwardly. Thus, the first body 112 is operatively connected to the second body 14 proximate the top end of the device. Hinges of various types can be used to provide such functionality. The hinges need only be located proximate the top end of the device, including on the side edges of the device. It should be noted that the device 110 as illustrated in FIG. 23 shows an expansion slot 142 that can be used for inserting memory for storage purposes or inserting other modular expansion devices for any number of purposes. Also, a second set of buttons 140 can be present on the inside face of the first body 112. These buttons can include a second telephone key pad or other buttons for other purposes. A second video sensor 129 is also optionally positioned on the first body 112.

Figure 24:
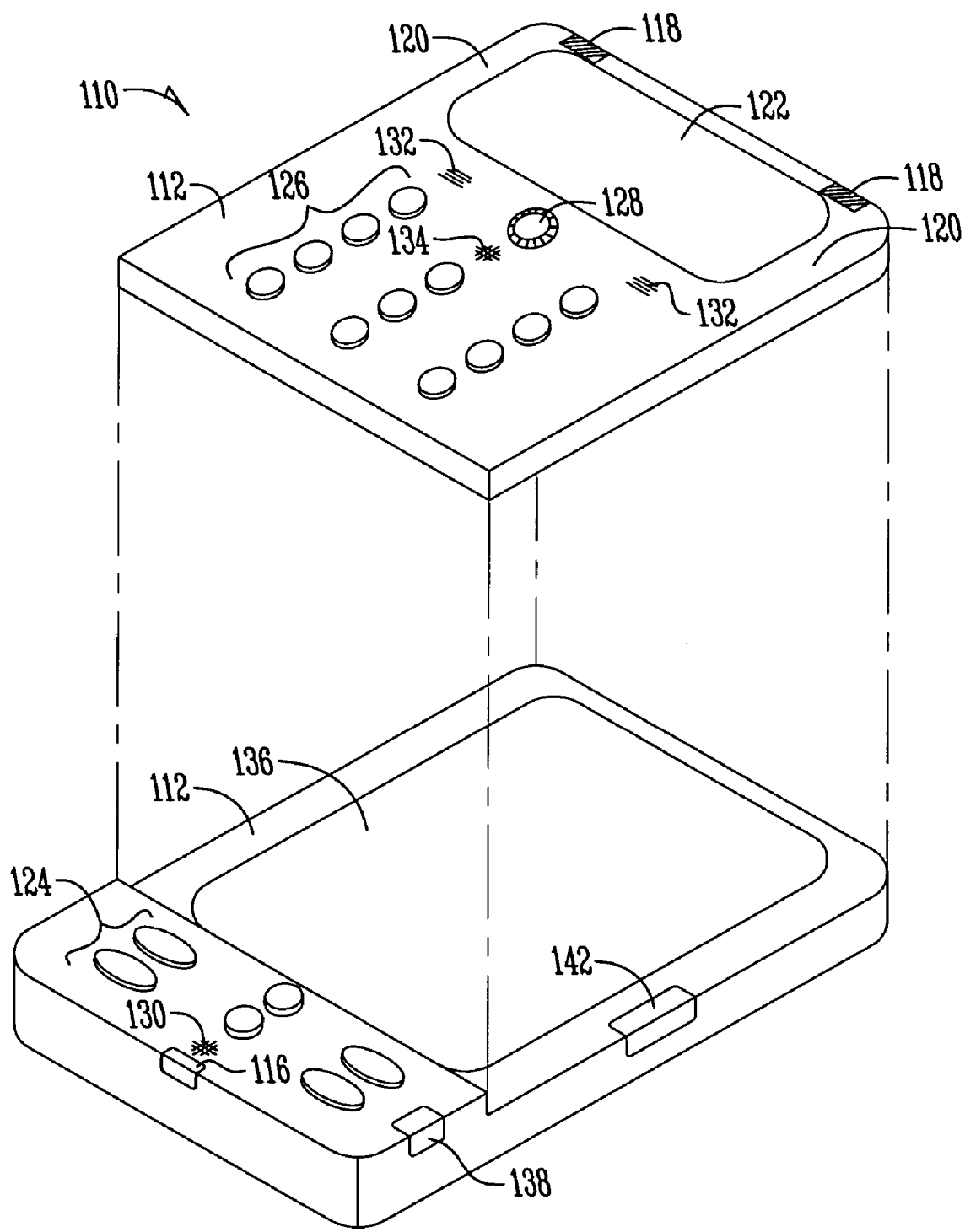
FIG. 24 provides a perspective view of one embodiment of the present invention where a removeably attached first body is separated or detached from a second body.

FIG. 24 shows another embodiment of the present invention. In FIG. 24, the first body 112 is removeably attached to the second body 114. FIG. 24 illustrates the first body 112 being removed from the second body 114. Thus, FIG. 24 illustrates the device in an open position. In this position, the video sensor 128 is separated from the second body 114. In this embodiment, the first body 112 and second body 114 would both have close range transceivers. This allows the video acquired with the video sensor 128 of the first body 112 to be transmitted to the second body 114. In addition, the present invention provides for transmission of audio messages, button status or control information between the two devices.

When in an open position, the display 136 can be used as a view finder. Thus, the image required with the video sensor 128 is displayed on the display 136. This embodiment of the present invention can be used for video conferencing to allow the first body 112 to remain stationary with the video sensor 128 fixed on a user. When used in such a manner, microphone and speaker functions can be performed with an earpiece as will be described or with a speaker microphone incorporated in the second body 114.

FIG. 25 illustrates a block diagram of a personal communication system according to one embodiment of the present invention. The personal communication system 150 includes a handheld device 174. The handheld device 174 includes a first body 170 and a second body 172. The first body 170 includes an intelligent control such as a processor 152 electrically connected to a display 154. The display is preferably a color display, although can be gray scale. The display 154 preferably has a high resolution. There is a voice transceiver 156 also connected to the processor 152. The voice transceiver 156 can operate using numerous standards such as are typically associated with cellular telephones, satellite phones or other wireless phones. In addition, there is a close range transceiver 158 operatively connected to the processor. The close range transceiver can be a BLUETOOTH transceiver, a UWB transceiver, or it can operate via other standards such as are known within the art. In addition there is a plurality of manual buttons 160 operatively connected to the processor 152. An optional video sensor 161 is also shown.

Within the second body 172 of the personal communication device 150 there is a video sensor 162. The video sensor 162 can be a CCD camera or other type of image sensing device. Also associated with, disposed, or housed within the second body 172 is a microphone 164, a speaker 166, and a plurality of buttons 168. The present invention contemplates that all of these devices can be operatively connected to a processor 152. It contemplates that all of these components of the second body 172 can be operatively connected to the processor 152 of the first body. Alternatively, an additional processor can be disposed within the second body 172.

Also shown in the system 150 is an earpiece 176. The earpiece 176 includes a close range transceiver 178. Operatively connected to the close range transceiver 178 is an air conduction sensor 180 and a bone conduction sensor 812. The present invention contemplates that the close range transceiver 178 can include a processor for processing voice sound signals received from the air conduction sensor 180 and the bone conduction sensor 182. There is also a speaker 184 electrically connected to the close range transceiver 178.

FIG. 26 illustrates another embodiment of a system of the present invention. In FIG. 26, a first body 190 is separated from a second body 102. In this embodiment, in the second body 102, the buttons 168, microphone 164, and speaker 166 as well as the video 162 are operatively connected to a close range transceiver 192 within the second body 102. The present invention contemplates that the close range transceiver 192 can include a processor.

The present invention provides for a method of providing video communications. According to the method, the present invention provides for a device having a first body with the processor operatively connected to a display, a plurality of buttons, voice transceiver, and a first close range transceiver. The device also has a second body having a video imaging device and operatively connected to a second close range transceiver. The first body being removable from the second body, thus, the first body can be removed from the second body as shown in FIG. 26. The present invention then provides for acquiring a video image with the video imaging device and transmitting the video from the second body to the first body. Then the video image can be displayed on the display of the first body.

Thus, a user can place the second body 102 at a remote location in order to take video images and then monitor the video images on the first body 190. This feature can be useful for taking photographs of one's self and can be used in video conferencing applications. The invention also contemplates that voice can still be transmitted to the second body 102 and that sound information can be transduced by the microphone 164 of the second body 102. The user can then monitor on the display 154 the image from the video camera 162. The present invention contemplates that the display 154 can be used as a view finder. The video information shown on display 154 can then also be transmitted over a network through the voice transceiver 156.

Figure 27:
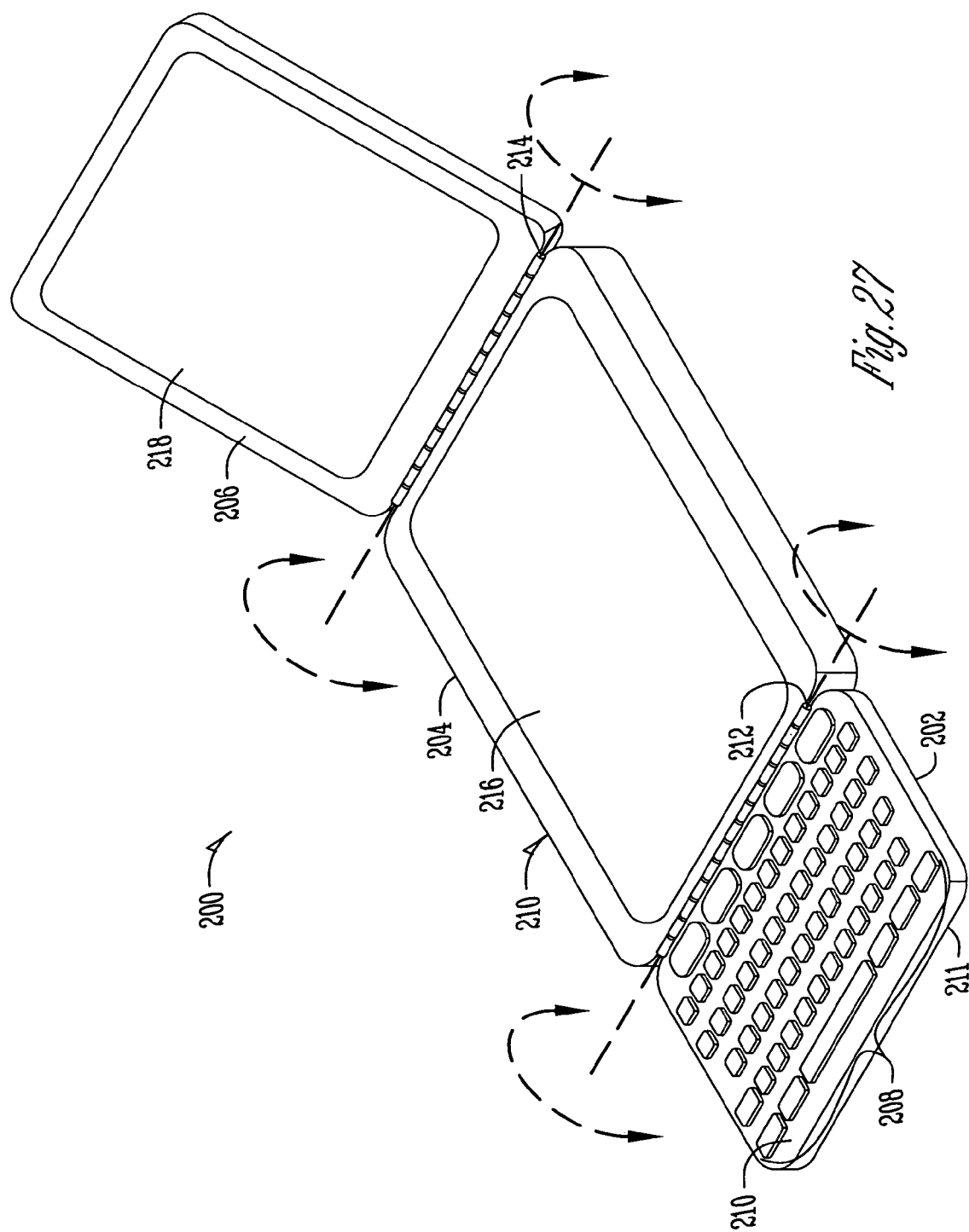
FIG. 27 provides a perspective view of another embodiment of a personal communications device having two displays.

FIG. 27 illustrates another embodiment of a personal communications device 200. The personal communications device 200 includes a first body 210 operatively connected to a second body 206 and a third body 202. The first body 210 can be operatively connected to the second body 206 and/or the third body 202 through any number of connection mechanisms, including through use of a hinge 214 and 212. The present invention contemplates that various types of hinges can be used, including, but not limited to sliding hinges.

The second body 206 includes first and second opposite faces. One or more of these opposite faces can include a display, such as display 218. There is also a display 216 illustrated on the first body 210. The first body 210 also includes opposite sides, including a bottom surface 204 opposite a top surface that includes the display 216.

The third body 202 includes first and second opposite sides, such as a first side 210 and a second side 211. On the first side 310 is a plurality of keys 208. The plurality of keys 208 can be arranged into a QWERTY type key arrangement. Such an arrangement can be conducive to thumb-typing. The present invention also contemplates that the third body 202 can be collapsible/expandable to provide a foldable keyboard that is greater in size. The present invention further contemplates that various types of user interface structure can be disposed on the second side 211 of the third body 202, including a different arrangement of buttons, such as buttons in a keyboard or dial pad configuration. Another display can be positioned on the second side 211 of the third body 202 in place of or in addition to another set of buttons.

Figure 28:
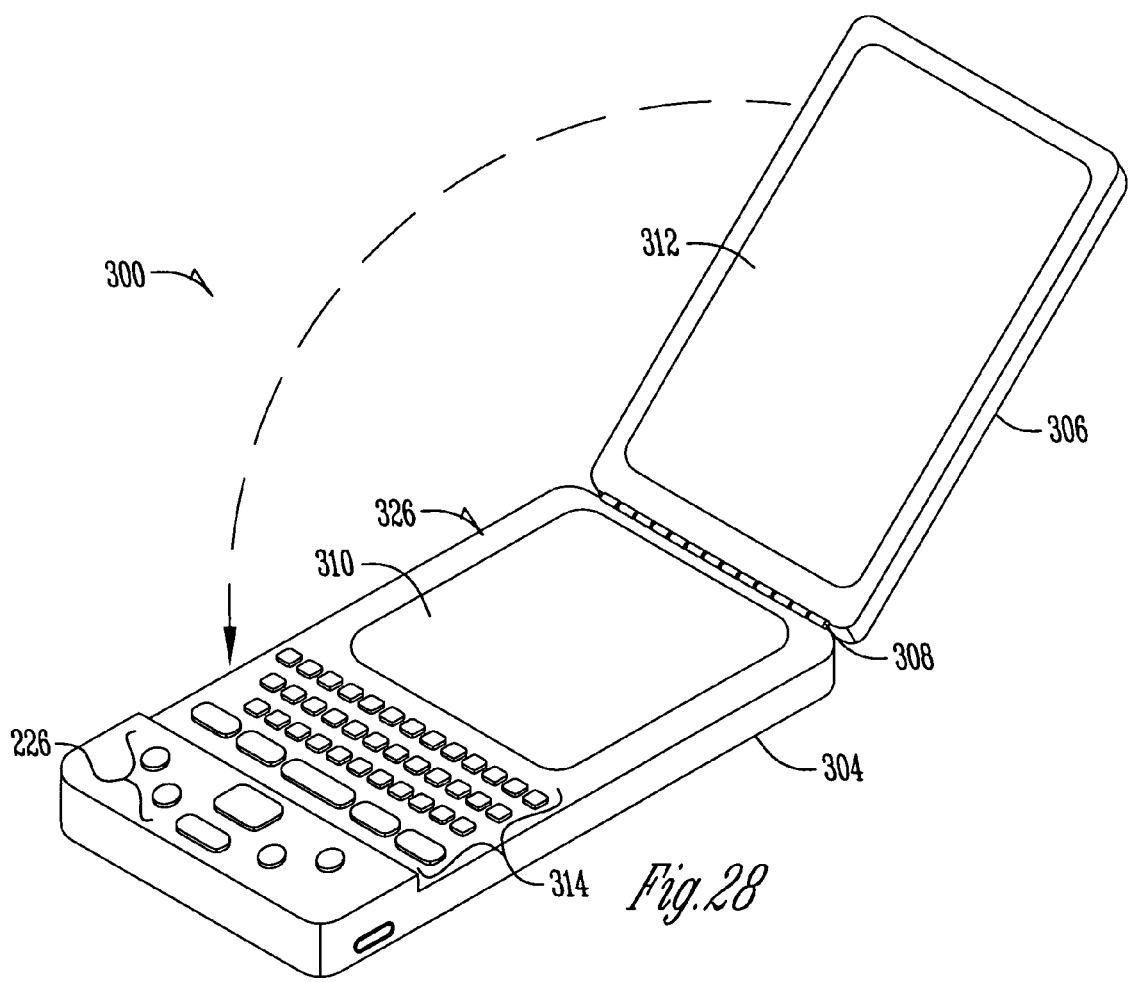
FIG. 28 provides a perspective of another embodiment of a personal communications device having two displays and in an open position.
Figure 29:
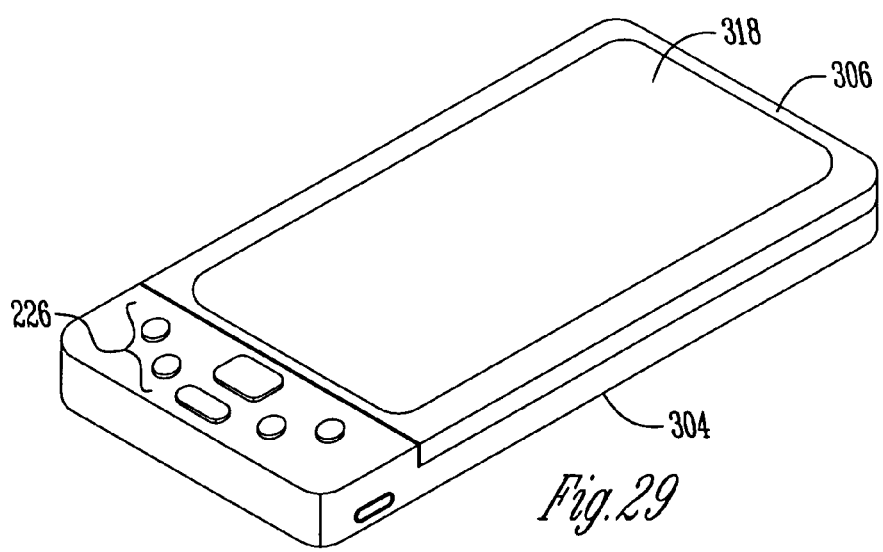
FIG. 29 provides a perspective of the personal communications device of FIG. 28 in a closed position.

FIGS. 28 and 29 illustrate another embodiment of the present invention in an open and closed position, respectively. The device 300 includes a first body 326 and a second body 306. The first body 326 and second body 306 are preferably operatively connected, such as with a hinge 308. Although the hinge 308 shown in FIG. 28 is positioned along the top of the first body 326, the present invention contemplates that the hinge 308 can be positioned otherwise. For example, separate hinges could be placed on the right and left sides of the first body 326 with arms that extend upwardly. The second body 306 preferably includes a display 312. The display 312 can be of various sizes or proportions. In one preferred embodiment, however, the display 312 provides a 3:2 aspect ratio. The first body 326 as shown also includes a display 310. A plurality of buttons 314 in a keyboard-type configuration is also shown on the first body 326. There are also a plurality of buttons 226 shown which are accessibly exposed both in the open position and the closed position. When in the closed position, a display 318 is also accessible.

Figure 30:
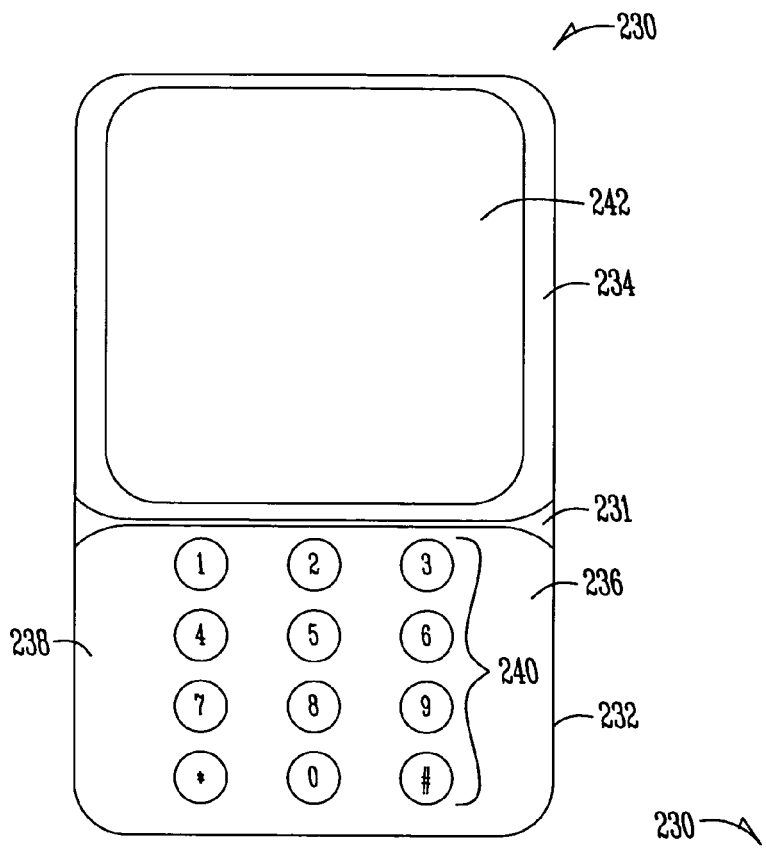
FIG. 30 provides a view of one embodiment of the personal communications device of the present invention where the device is configured to provide access to a first set of buttons, such as a telephone keypad when the device is in a closed position.
Figure 31:
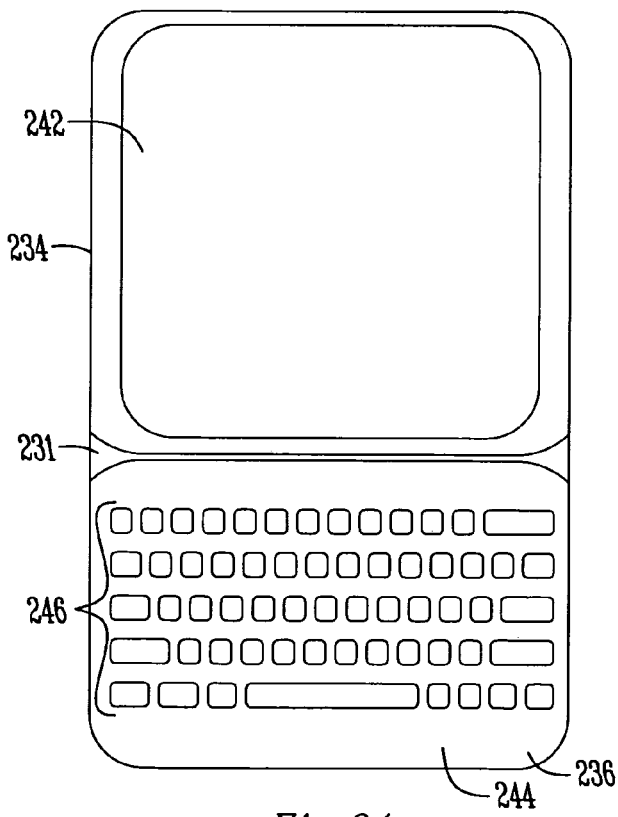
FIG. 31 provides a view of the personal communications device of FIG. 30 configured to provide access to a second set of buttons, such as a keyboard when the device is in a closed position.

FIGS. 30-36 illustrate another embodiment of the present invention. The embodiment shown in FIGS. 30-36 includes three bodies, two of which are slidably hinged and flippable with respect the remaining body. In FIG. 30, a personal communications device 230 includes a second body 234 and a third body 236, both of which are operatively connected to a first body 231. It is preferred that this connection is a slideable hinge in both instances, but the present invention contemplates that other structures can also be used. The use of the slideable hinge allow the third body 236 to be slid and flipped such that a first side 232 is shown in FIG. 30 and a second side 244 is shown in FIG. 31. A first plurality of buttons 240, such as those used to form a dial pad are shown on the first side 232. A second plurality of buttons 246, such as a keyboard or typing configuration are shown on the second side 244. The present invention also provides that the second body 234 can be slidably hinged to the first body 231, with opposite sides of the second body 234 providing varying functionality and/or user interface elements.

Figure 32:
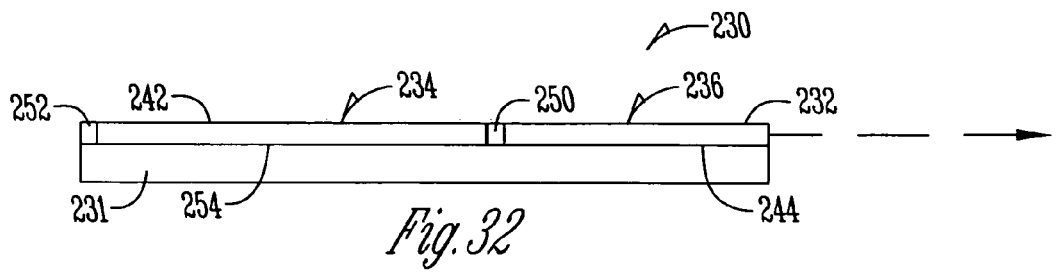
FIG. 32 illustrates a side view of the personal communications device of FIGS. 30-36, showing the personal communications device in a closed position.
Figure 33:
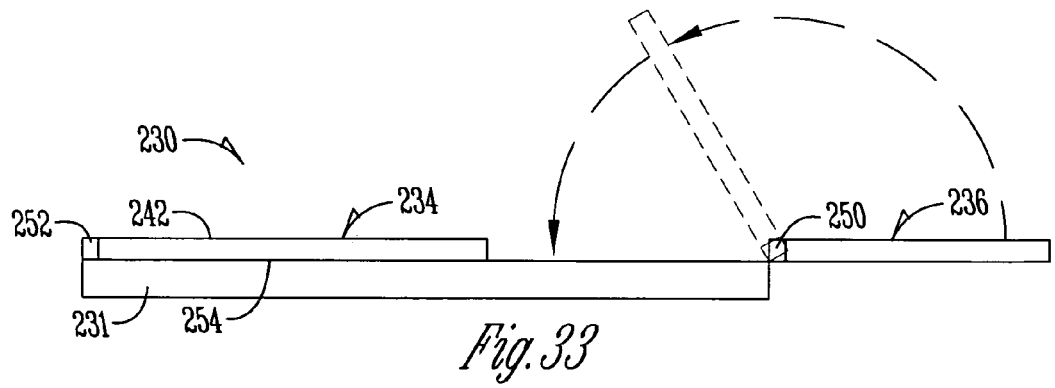
FIG. 33 illustrates a side view of the personal communications device of FIGS. 30-36, showing the personal communications device in an open position.
Figure 34:
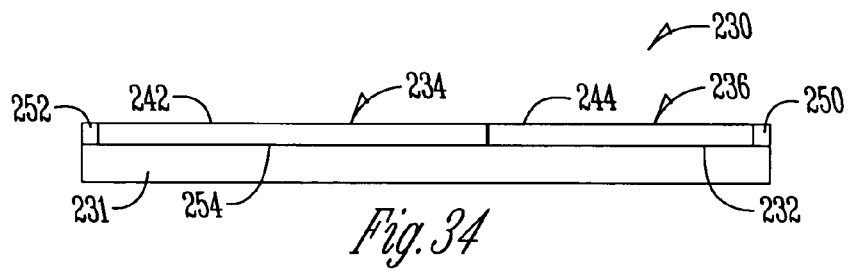
FIG. 34 illustrates a side view of the personal communications device of FIGS. 30-36 showing the personal communications device in a closed position.

FIGS. 32-36 provide side views of a personal communication device 230. As shown in FIG. 32, there is a first slideable hinge 250 and a second slideable hinge 252. A third body 236 includes a first side 232 and opposite second side 244. A first body 231 is present and the third body 236 is slidably hinged to the first body 231. Similarly, the second body 234 is slidably hinged to the first body 231.

FIG. 32 illustrates the third body 236 in an extended position, the third body 236 being capable of then rotating or flipping inward to expose the opposite surface of the third body 236. Comparing FIG. 32 with FIG. 34, the figures illustrate alternative closed positions, side or face 232 exposed in FIG. 32, and side or face 244 exposed in FIG. 34. The slideable hinge 250 is in a different position in FIG. 32 than in FIG. 34.

Figure 35:
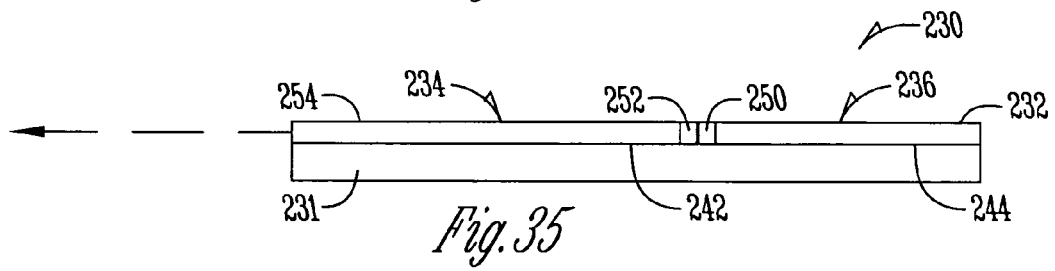
FIG. 35 illustrates a side view of the personal communications device of FIGS. 30-36 in an alternative closed position.
Figure 36:
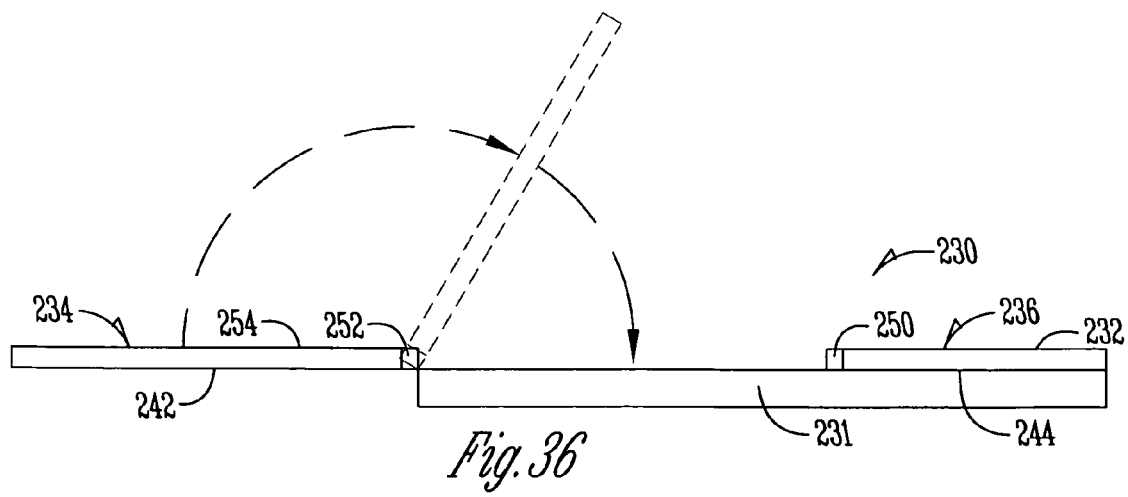
FIG. 36 illustrates a side view of the personal communications device of FIGS. 30-36 in another open position.

FIG. 35 and FIG. 36 illustrate that the second body 234 can be manipulated in a similar manner as the third body 236.

Thus the second body 234 can be slid outwardly or inwardly and flipped accordingly to expose different faces or sides of the second body 234.

The present invention provides for different types of user interface elements, such as displays, touch pads, button configurations, video sensors or other variations to be present on the various sides of the device. Thus, a flexible communications device is provided that provides meaningful choices of user interface elements to be accessible to a user.

The present invention provides for numerous variations which should be apparent from the various embodiments when viewed by one skilled in the art. For example, the present invention provide for variations in types of communications technology, the specific structures used, the specific shapes, styles, and orientations of the personal communication devices. These and other variations fall within the scope of the present invention.

What is claimed is:

1. A handheld personal communications device for voice and video communications comprising:
    a first body having a display;
    a second body having a plurality of manual inputs, the first body adapted for attachment to the second body, the personal communications device having an open position wherein the display of the first body and the manual inputs of the second body are accessibly exposed to face a user, the personal communications device having a closed position wherein the display of the first body is at least partially protected by the second body and the manual inputs of the second body are accessibly exposed to face the user;
    a video camera operatively connected to the second body such that in the closed position, the video camera faces the user and in the open position the video camera faces away from the user;
    a cellular transceiver is in at least one of the first body or the second body; and a close range transceiver in at least one of the first body or the second body.

2. The handheld personal communications device of claim 1 wherein the display includes a sub region viewable by the user in the closed position.

3. The handheld personal communications device of claim 1 wherein the first body is removably attached to the second body and each of said first body and said second body includes a close range transceiver.

4. The handheld personal communications device of claim 1 wherein the display is adapted to operate as a view finder associated with the video camera when in an open position.

5. A system for personal voice and video communications, comprising:
    a handheld personal communications device comprising a first body having a display and a second body having a plurality of manual inputs, the first body adapted for attachment to the second body, the personal communications device having an open position wherein the display of the first body and the manual inputs of the second body are accessibly exposed to face a user, the personal communications device having a closed position wherein the display of the first body is at least partially protected by the second body and the manual inputs of the second body are accessibly exposed to face the user, and a video camera operatively connected to the second body such that in the closed position the video camera faces the user and in the open position the video camera faces away from the use, the handheld personal communications device having a voice transceiver and a close range transceiver;
    an earpiece comprising a bone conduction sensor operatively connected to a second close range transceiver for communication with the handheld personal communications device.

6. The system of claim 5 wherein the first body and the second body of the handheld personal communications device are removeably attached.

7. A method of providing video communications comprising:
    providing a device comprising a first body having a processor operatively connected to a display, a plurality of buttons, a voice transceiver, and a first close range transceiver and a second body having a video imaging device and operatively connected to a second close range transceiver, the first body removable from said second body;
    removing the first body from the second body;
    acquiring a video image with the video imaging device and transmitting the video from the second body to the first body;
    displaying the video image on the display of the first body.

8. The method of claim 7 further comprising storing a representation of the video image.

9. The method of claim 7 further comprising transmitting the video image using the voice transceiver.

10. The method of claim 7 wherein the second body further comprises a microphone operatively connected to the second close range transceiver.

11. The method of claim 10 further comprising transmitting audio from the second body to the first body.

12. A cellular phone for voice and video communications comprising:
    a cellular phone housing having a first body and a second body;
    a cellular transceiver disposed within the cellular phone housing;
    the first body having a display;
    the second body having a plurality of manual inputs, the first body adapted for attachment to the second body, the personal communications device having an open position wherein the display of the first body and the manual inputs of the second body are accessibly exposed to face a user, the personal communications device having a closed position wherein the display of the first body is at least partially protected by the second body and the manual inputs of the second body are accessibly exposed to face the user;
    a video camera operatively connected to the second body such that in the closed position, the video camera faces the user and in the open position the video camera faces away from the user.

* * * * *